United States Patent
Dolan

(10) Patent No.: US 9,538,622 B1
(45) Date of Patent: *Jan. 3, 2017

(54) COMBINED LIGHTING DEVICE WITH AN INTEGRATED DIMMING CONTROL SYSTEM

(71) Applicant: DOLAN DESIGNS INCORPORATED, Portland, OR (US)

(72) Inventor: Patrick S. Dolan, Portland, OR (US)

(73) Assignee: DOLAN DESIGNS INCORPORATED, Portland, OR (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/695,464

(22) Filed: Apr. 24, 2015

Related U.S. Application Data

(63) Continuation of application No. 13/762,186, filed on Feb. 7, 2013, now Pat. No. 9,035,572.

(60) Provisional application No. 61/596,101, filed on Feb. 7, 2012.

(51) Int. Cl.
| | |
|---|---|
| H05B 37/02 | (2006.01) |
| H05B 35/00 | (2006.01) |
| F21S 8/06 | (2006.01) |
| F21V 21/08 | (2006.01) |
| F21V 21/008 | (2006.01) |

(52) U.S. Cl.
CPC ............. *H05B 37/0272* (2013.01); *F21S 8/06* (2013.01); *F21V 21/008* (2013.01); *H05B 35/00* (2013.01)

(58) Field of Classification Search
CPC ........ H05B 37/0272; H05B 35/00; F21S 8/06; F21V 21/008

USPC ........................................................ 315/294
See application file for complete search history.

(56) References Cited

U.S. PATENT DOCUMENTS

| | | |
|---|---|---|
| 4,719,446 A | 1/1988 | Hart |
| 4,918,690 A | 4/1990 | Markkula |
| 5,059,871 A | 10/1991 | Pearlman |
| 5,191,265 A | 3/1993 | D'Aleo |
| 5,736,965 A | 4/1998 | Mosebrook |
| 5,838,226 A | 11/1998 | Houggy |
| 5,844,888 A | 12/1998 | Markkula |
| 5,848,054 A | 12/1998 | Mosebrook |
| 5,905,442 A | 5/1999 | Mosebrook |

(Continued)

OTHER PUBLICATIONS

Amazon.com, Casablanca Inteli Touch III Handheld Remote Control, First available Nov. 1, 2010.

*Primary Examiner* — Dylan White
(74) *Attorney, Agent, or Firm* — Marger Johnson

(57) ABSTRACT

A multi-scene, multi-zone lighting device includes a support structure supporting multiple lighting zones, an ensemble of the zones defining a lighting scene. A master dimming control built into the support structure has a power input line and multiple dimmers. The zones are coupled to the dimmer output lines to receive a controlled setting from the corresponding dimmer. A remote control device communicates with the master dimming control, and has a memory for storing settings for the multiple zones and a user interface for a user to select a stored setting for each zone or a scene composed of multiple zones. Settings can be prestored or programmed by the user. The master dimming control includes a controller responsive to receiving the set of settings to set the controlled setting of the corresponding dimmer for each zone in the selected scene to conform the zones to the settings in the selected scene.

20 Claims, 38 Drawing Sheets

(56) References Cited

U.S. PATENT DOCUMENTS

| | | | |
|---|---|---|---|
| 5,909,087 A | 6/1999 | Bryde | |
| 5,967,640 A * | 10/1999 | Moriyama et al. | 362/147 |
| 6,046,550 A | 4/2000 | Ference et al. | |
| 7,227,341 B2 | 6/2007 | Downey | |
| 7,345,998 B2 | 3/2008 | Cregg | |
| 8,467,887 B2 | 6/2013 | Jung et al. | |
| 9,035,572 B1 * | 5/2015 | Dolan | 315/294 |
| 2006/0076908 A1 * | 4/2006 | Morgan et al. | 315/312 |
| 2006/0202851 A1 | 9/2006 | Cash et al. | |
| 2009/0218951 A1 | 9/2009 | Weaver | |
| 2009/0230894 A1 | 9/2009 | De Goederen et al. | |
| 2009/0284966 A1 * | 11/2009 | Crookham | F21S 8/033 362/231 |
| 2010/0277106 A1 | 11/2010 | Baaijens | |
| 2011/0140832 A1 | 6/2011 | Vinkenvleugel et al. | |

* cited by examiner

Prior Art (Single Dimmer)

Prior Art (Multiple Dimmer Controlled Light Fixtures)

Master Dimmer Controller – Generic Wiring Example

Dimming Control Keypad – Generic Wiring Example

As defined in the Echelon PL3170 Publication
"005-0193-01C PL Data Book"

KEYPAD
Power Line Communications Module

KEYPAD
POWER SUPPLY

As defined in the Echelon PL3170 Publication
"005-0193-01C PL Data Book"

MASTER DIMMING CONTROLLER
POWER LINE COMMUNICATIONS MODULE

MASTER DIMMING CONTROLLER
POWER SUPPLY

COMBINED LIGHTING DEVICE WITH AN INTEGRATED DIMMING CONTROL SYSTEM

CROSS-REFERENCES TO RELATED APPLICATIONS

This application is a continuation of co-pending U.S. application Ser. No. 13/762,186, filed Feb. 7, 2013, which claims the benefit of provisional patent application Ser. No. 61/596,101, filed Feb. 7, 2012. Each of those applications is incorporated in this patent application by this reference.

FIELD OF THE INVENTION

The present invention generally relates to a lighting device with a master dimming control system enclosed with the lighting device. More particularly, the lighting device has a plurality of lighting effects, scenes and zones controlled by one or more remote control switches.

BACKGROUND

Existing lighting control systems that are multi-zone multi-scene are expensive to install and usually require a lighting designer or lighting specialist to create the lighting design. These lighting systems are not installed just to raise and lower the lighting in a room but rather they are installed so they will create a dramatically different lighting effect with each of the different actuators on a remote, wall control, or master control. In order to install a multi-zone multi-scene in new or existing construction, this type of system requires the electrician to run wiring, connecting each fixture on the same zone back to the master control station, which usually requires a four gang electrical box. In many installations in existing homes it is necessary to cut out sections of the ceiling drywall or lath and plaster to run wiring, which adds greatly to the complexity and cost of the installation. Prior art multi-zone multi-scene lighting controls have not been designed to control one lighting device in a room but rather a group of lights selected, and the lighting design for such a system usually requires the expertise of a professional lighting specialist who has been trained. A typical installation over a table might include a pair of recessed lights mounted four feet apart and centered on the chandelier and the table, which would then provide task lighting or direct lighting on the table (zone 1). Another recessed light would be installed to accent a centerpiece arrangement that would later be placed directly under the chandelier (zone 2), while another couple of recessed lights would be positioned to direct light at art work in the room (zone 3). A chandelier would be installed, centered on the table (zone 4).

Lighting effects such as general area lighting, accent lighting, task lighting and are often used in lighting the interiors of residential and commercial spaces.

Grazing as a lighting effect is commonly used in interior design in order to accentuate the architecture of a residence or commercial building. This is accomplished by placing a light source close to the plane of a wall and then directing the light beam obliquely across the wall's surface. Grazing is a particularly dramatic way to highlight the texture of a stone or brick wall by creating shadows.

A need remains for a way to provide multi-scene, multi-zone lighting with minimal wiring and ease of use.

SUMMARY OF THE DISCLOSURE

One aspect of the invention is a multi-zone, multi-scene dimming system that does not require installing new wiring in the walls or ceiling. With this invention no special wiring is required. For example, you could install the wall remote in place of an existing single-pole switch that controls a lighting device such as a chandelier. The wall remote would fit in the same switch box and fit inside a decora style switch plate. This wall-mounted remote would preferably have at least four actuators for selecting different scenes as well as an on/off button. There would be an antenna in or coupled to the remote.

Another aspect of the invention is incorporation of several different lighting techniques such as general area lighting, task lighting, grazing, indirect lighting and accent lighting into the support structure of a single lighting device wherein a multi-zone multi-scene dimming system is built into the base or body of the single device such as a chandelier, ceiling light, floor lamp, wall mounted light or ceiling fan.

General area lighting provides light without concern for directing the light in any specific direction, lighting the general area without placing any focus on any features in the area, whereas task lighting provides bright lighting direct to a specific surface such as a dining room table or conference room table or rug. Ninety percent of the light is directed downward. On the other hand, accent lighting for a lighting device is directed narrowly at a specific object such as a flower arrangement or statue centered directly under the center of the chandelier or at a piece of artwork on an adjacent wall.

Another aspect of the invention is to be able to offer a lighting device that has multiple scenes with layered lighting effects such as general area lighting, task lighting, grazing and accent lighting that can all be pre-programmed and easily selected.

Scenes are defined by different combinations of on/off and/or intensity conditions and fade rates of the zones. A lighting zone is defined by one or more light sources that are commonly controlled. For example, consider a four scene system wherein zone 1 is defined by a lighting device with a plurality of general area lights, zone 2 is defined by a plurality of task lights, zone 3 is defined by a plurality of accent lights and zone 4 is defined by indirect lighting. Various on/off and intensity combinations of the zones may be imagined, each of which defines one possible scene. Thus, scene 1 might be defined by zone 1 (a plurality of general area lights) 10% intensity, zone 2 (plurality of task lights) at say, 50% intensity, zone 3 off and zone 4 (indirect lighting) at 20%. Each scene may be selected by depressing on one of the scene select options on one of the different remotes, or all zones may be turned off by depressing an off button as is common.

The defined scenes are stored in a master dimming control memory, together with a fade time representing a desired time for effecting a change from existing intensity for each zone in the most recently selected scene to the desired intensity for each zone in the currently selected scene. Optionally, controls can be provided for color changes, e.g., drivers for selecting combinations of different color LEDs used as light sources in one or more zones.

Each scene can be preset at the factory; also fade rates can be preset at the factory. One or more of the lighting devices are capable of being networked so they can operate with the same remote and can be turned on and off as well as display the same scenes when a given scene selection is made.

Each system can be controlled and programmed from a remote control. For instance, in a dining room a remote control could be installed in a standard single gang wall box and/or a hand-held or table top remote could be used.

In most entryways, a switch for an entry chandelier often is in a multi-gang box with a three or four-gang switch plates and other switches located adjacent to the entry chandelier switch. This invention allows the entryway switch to be replaced with a wall-mounted remote control that fits in a standard single gang box and in one gang of a decora plate.

In most dining rooms there is usually only one single gang box controlling a chandelier. With this invention, the existing switch is easily removed and replaced with a remote control with 4-6 different actuators from which to select different scenes, as well as an on/off control. There are no multi-zone multi-scene master controls that are able to fit into an industry standard single gang decora switch plate and box, so remotely installing the master dimming control in the chandelier or lighting device is a desirable advantage. A wall-mounted remote or a hand-held remote could use a touch screen or buttons as actuators that are commonly used in a smart phone or security controller along with any other known actuator.

Another aspect of the invention is an ability to provide a multi-scene lighting device with a selling demonstration mode incorporated in the master dimming control of the lighting device that will allow each of scenes to continually cycle. For instance in a four-scene program, if it was on scene 1, it could remain at scene 1 for 10 seconds, then cycle to scene 2 and stay there for 10 seconds and then cycle to scene 3 for 10 seconds and then cycle to scene 4 for 10 seconds and then turn off for 10 seconds and go back to scene 1, continually recycling through the different scenes in a loop.

Using either power line technology or wireless remote, would use a computer chipset that would include a dimming module. The chipset would be addressable. One of the preferred embodiments described in FIG. 3 (310) shows a master dimming system, which would preferably include communications module, such as an Echelon transceiver, connected to the circuit board inside the unit. There can be at least one transceiver for each lighting channel. Each chipset using wireless and/or power line technology can be individually addressable and can have a dimming module connected to it, if the electrical device is dimmable, otherwise it would just turn on and off.

The master dimming control system would be either installed inside part of the lighting device such as the canopy of a chandelier or the body of the lighting device. Alternately, more than one master dimming control could be installed in a lighting device. The master dimming control can be a unitary module incorporating both control and communication circuitry and dimmers or its components can be distributed in different parts of the lighting device, for example, the canopy, and body of a chandelier.

In the preferred embodiment of this invention there would be two types of remote controllers: a hard wired remote that would be capable of sending a signal over standard house wire using an Echelon power line smart transceivers to the master control panel or alternately by an infrared remote or a radio frequency remote that is wall mounted or handheld. In some applications, both power line technology and wireless might be used. The invention can be hard-wired using three-wires (i.e., having connections to the hot, dimmed hot and neutral lines) or as a two wire system. It will work on a switched leg. The wall mounted controls will work with single pole, 3-way and 4-way installations.

The remote units are preferably provided with manual controls for selecting different scenes and/or for temporarily raising or lowering the intensity of all zones simultaneously.

The manual controls can include dedicated push buttons, state-selectable buttons and soft-keys, a touch-screen displaying buttons or a combination thereof.

A feature of this device would be that it has a plurality of zones of lighting whereby different zones can be mixed to create different scenes. Another feature of the remote control is that the remote control would be fully programmable.

If the end user would like to change one or more of the pre-set scenes or fade rates set at the factory, it can be accomplished from the remote controllers or on the master control panel.

In one embodiment of this invention, there are four scenes and four lighting zones. In selecting one of the four scenes, it would be possible to create a dramatic change in the mood of the room with the raising and lowering of different zones. It should be recognized that numerous types of lamps could be interchanged in this lighting device, such as incandescent, fluorescent, halogen and LED lighting, as well as other types. A different driver can be used for each LED channel.

The invention enables a single lighting device that incorporates several lighting effects, such as general area lighting, down lighting, accent lighting, grazing, and indirect lighting and a plurality of up lighting each wired to different zones so that each type of lighting effect could be mixed to create different scenes of lighting.

DETAILED DESCRIPTION

Definitions

Lighting Scene: A lighting Scene is a group of Lighting Zones wherein each Zone's illumination level is determined by its respective dimmer.

Lighting Zone: A lighting Zone consists of one or more light sources or elements such as an incandescent lamps, halogen lamps or light emitting diodes whose illumination level is commonly controlled by a single dimmer. A lighting zone can also be a motor, as in a ceiling fan, with direction and speed controls.

Figure 1:
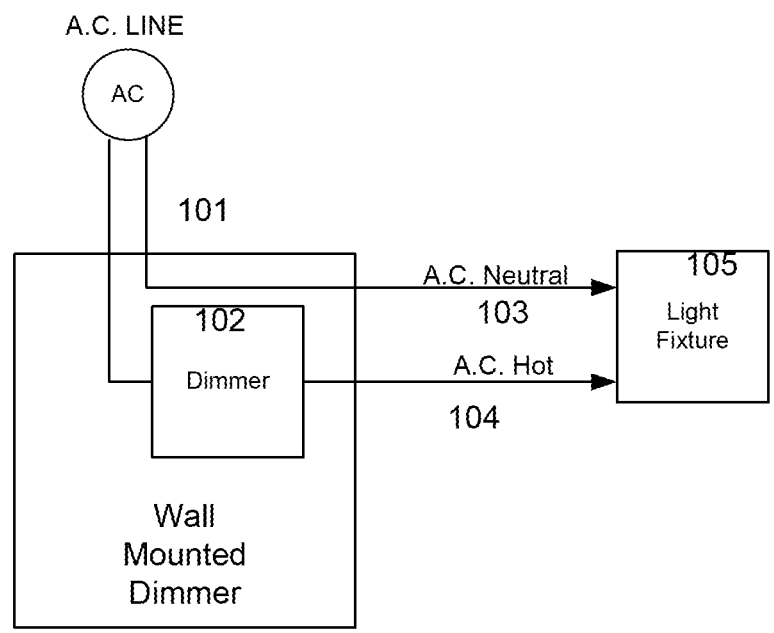
FIG. 1 is a block diagram of a conventional single dimmer circuit.

FIG. 1 exemplifies the prior art of a single dimmer 102 installed in a single gang electrical box controlling a single light fixture 105. This is representative of the most common existing wiring in residential buildings. The single A.C. Hot wire 104 precludes the dimmer from controlling more than one lighting zone. An existing residence wired in this configuration would require substantial and expensive remodeling of the existing wiring enclosed within the wall and ceiling spaces.

Figure 2:
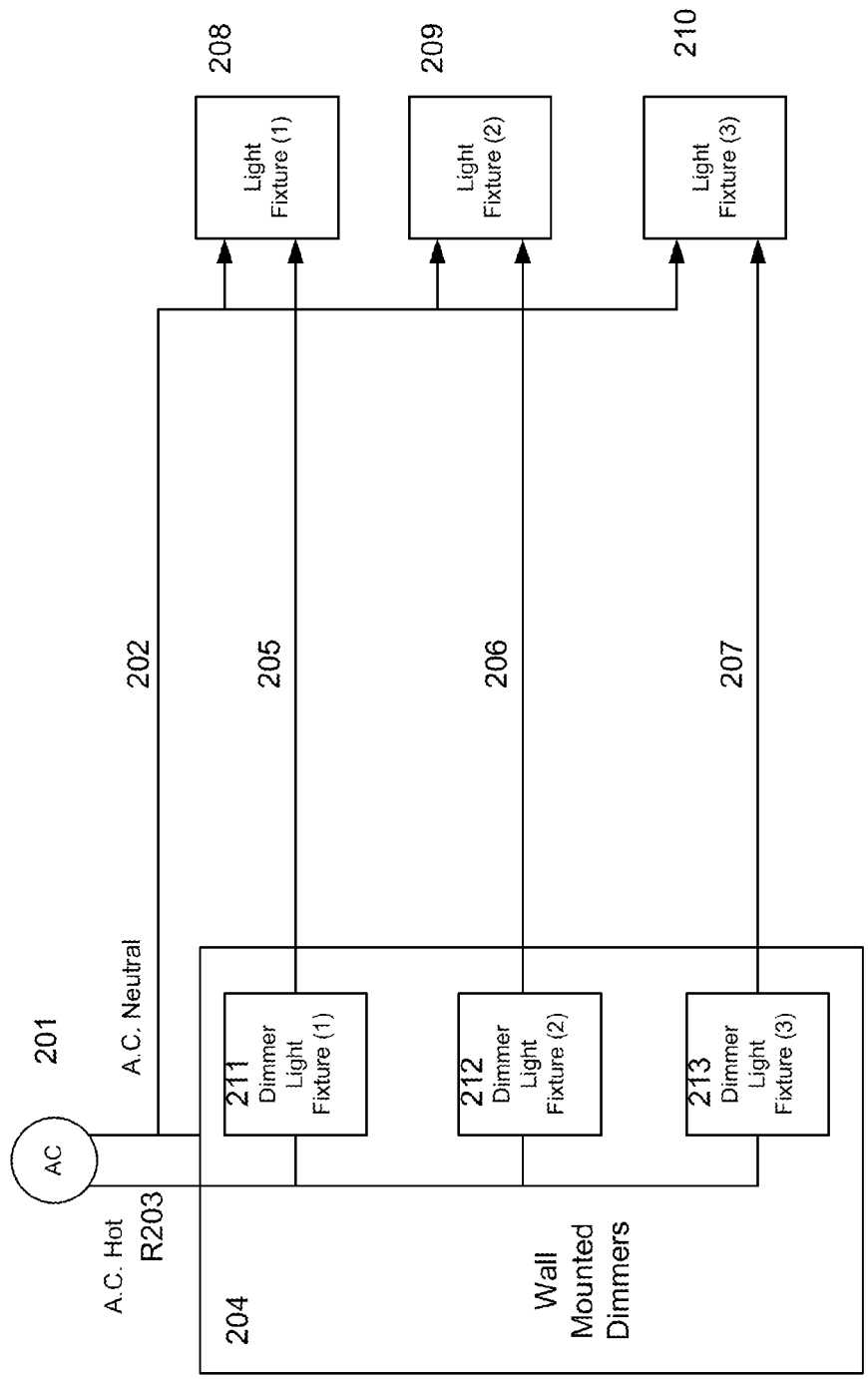
FIG. 2 is a block diagram of a conventional multiple dimmer circuit.

FIG. 2 exemplifies the prior art of multiple wall mounted dimmers controlling multiple lighting zones. This is representative of common existing wiring in residential buildings for multiple dimmers. In this configuration, existing residences are precluding from changing the location of or adding additional lighting zones without extensive remodeling.

Figure 3:
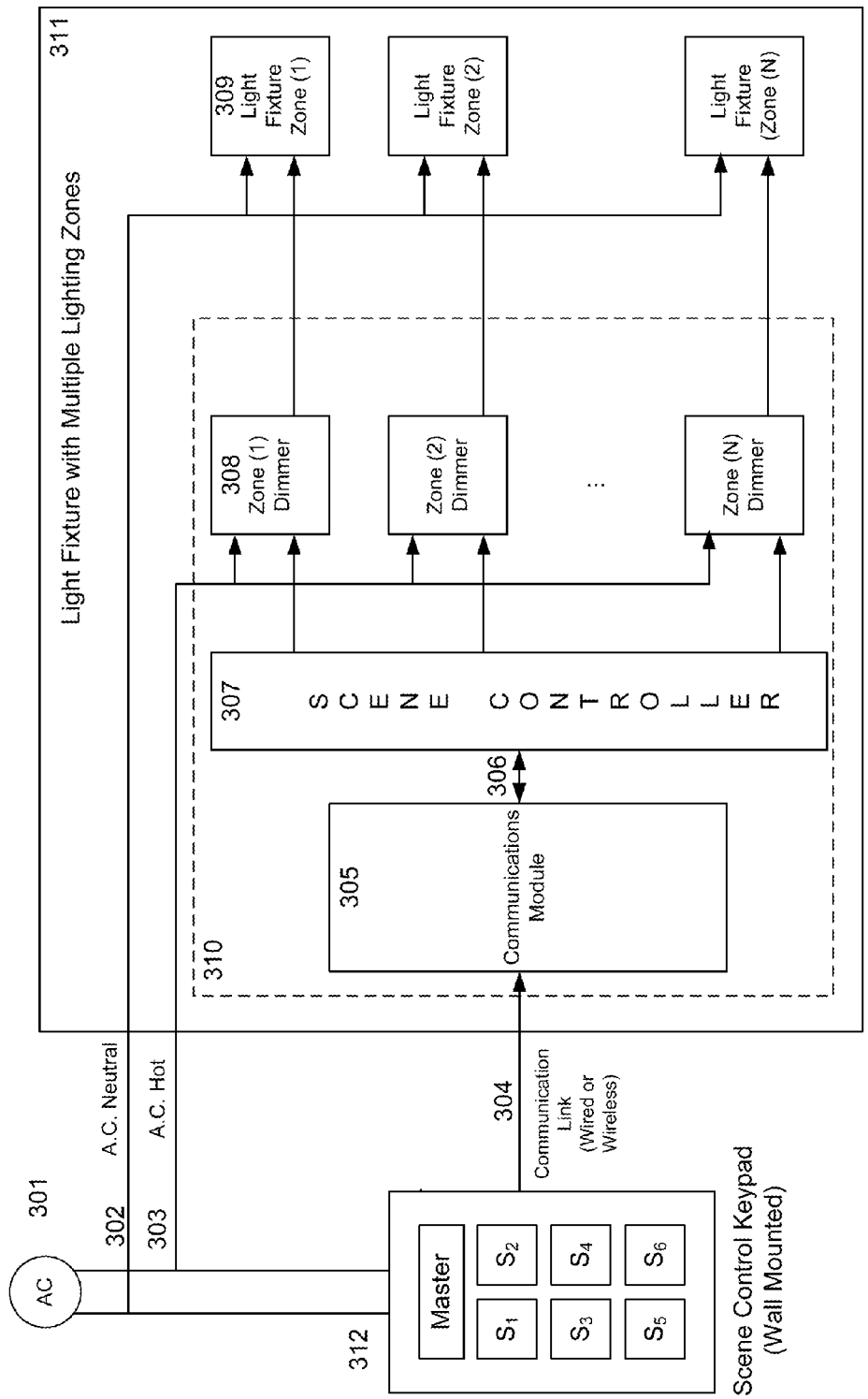
FIG. 3 is a block diagram of an embodiment of the invention providing remote scene control of multiple lighting zones in a lighting fixture.

FIG. 3 exemplifies the dimming control improvements over the prior art wiring limitations shown in FIG. 1 and FIG. 2.

In this exemplary illustration of system 301, a Master Dimmer Controller 310 is mounted within the physical support structure of a lighting device 311. Electrical power for the lighting device 311 is provided by a single A.C. circuit consisting of a A.C. Hot wire 303, A.C. Neutral wire 302 and safety ground wire (not shown). The Master Dimmer Controller 310 allows for a plurality of individually controlled dimmable lighting zones powered by a single A.C. circuit.

A wall mounted or portable keypad or remote control device 312 transmits digital information containing the illumination level for each lighting zone to the Master Dimmer Controller 310 via the Communication Link 304. The Communication Link 304 may be implemented in any of a plurality of wireless media including Radio Frequency (R.F.), Infrared Light (I.R.), Data over Power Line, or a directly wired connection. The remote control device can be a special-purpose device or can be implemented by software in a smart-phone using, e.g., BLUETOOTH® communications.

The Zone Dimmers 308 may support the electrical and dimming requirements of a multitude of lighting technologies such as incandescent lamps, low voltage halogen lamps, or L.E.D. lamps. Each Light Fixture Zone 309 has at least one lamp or other lighting element.

A lighting device with an integrated multiple zone dimming controller enables existing residential or commercial lighting fixtures to be retrofitted with an advanced lighting fixtures capable of providing advanced lighting architecture solutions without modifying the preexisting wiring.

Figure 4:
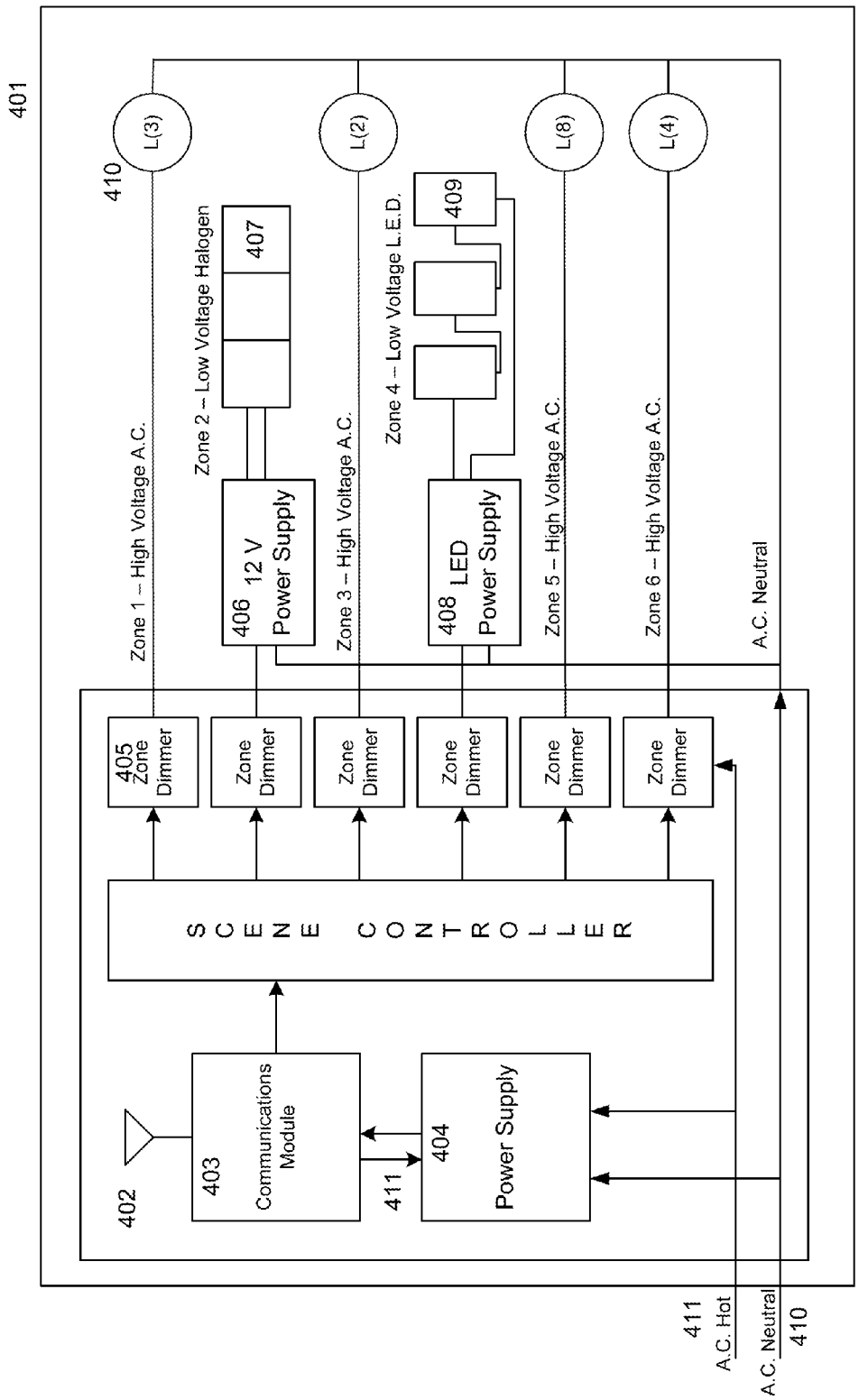
FIG. 4 is a block diagram of another embodiment of the invention providing remote scene control of multiple lighting zones in a lighting fixture which includes low voltage lighting elements.

FIG. 4 is an example of a generic lighting device consisting of an integrated Master Dimming Controller 402, six independently dimmable Zone Dimmers 405. In this example, the lighting fixture utilizes three illumination technologies in six zones: Zone 1 three incandescent lamps 401; Zone 2 three low voltage halogen lamps 407; Zone 3 two incandescent lamps; Zone 4 three L.E.D. lamps 409; Zone 5 eight incandescent lamps; Zone 6 four incandescent lamps.

Figure 5:
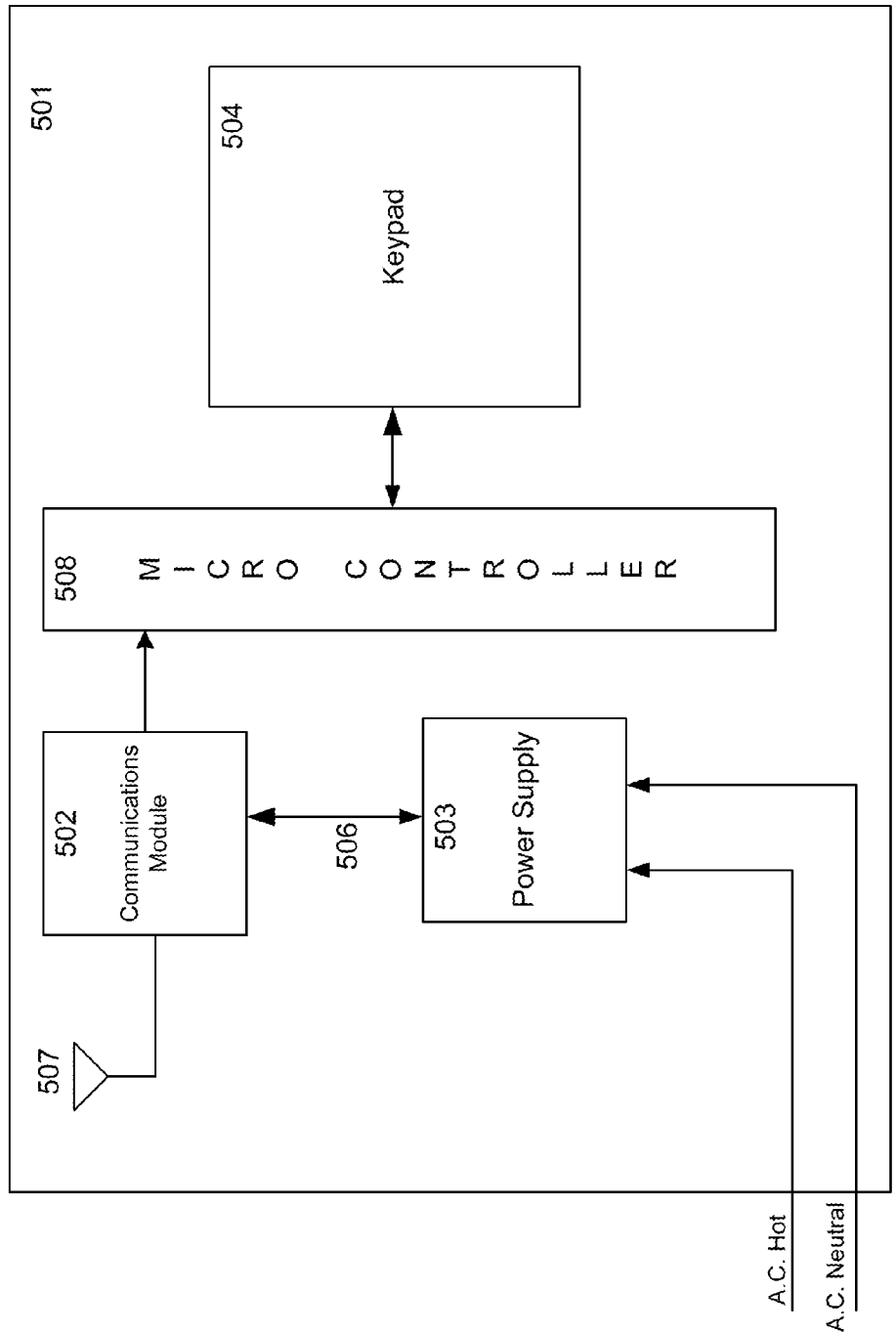
FIG. 5 is a block diagram of an embodiment of a dimming control keypad that can be used in the embodiments of FIGS. 3 and 4.

FIG. 5 is a block diagram of a typical wall mounted keypad for use in system 301. The microcontroller 508 detects and processes keypad 504 switch closures and transmits the state of each keypad switch to Master Dimmer Controller 310 via Communications Module 502.

Figure 6:
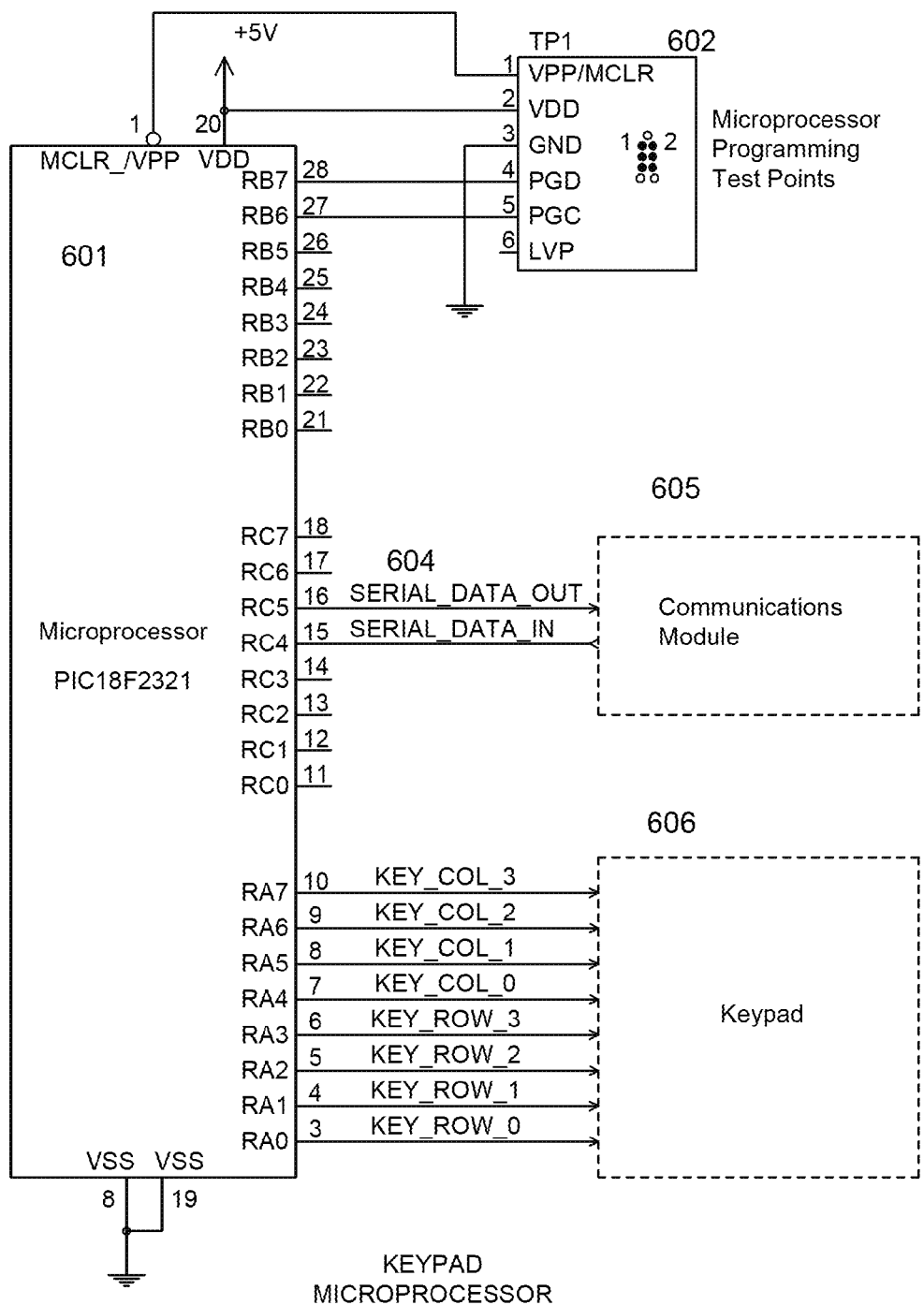
FIG. 6 is a schematic of an example of a keypad microprocessor for use in the keypad of FIG. 5.

FIG. 6 is an example implementation of the keypad microcontroller circuit. Microcontroller 601, such as a Microchip Technology microprocessor part number PIC18F4321, is programmed by interfacing the Programming Test Points 602 with a compatible programming device such as a Microchip Technology PICKIT3, ICD3 or RealICE.

Figure 7:
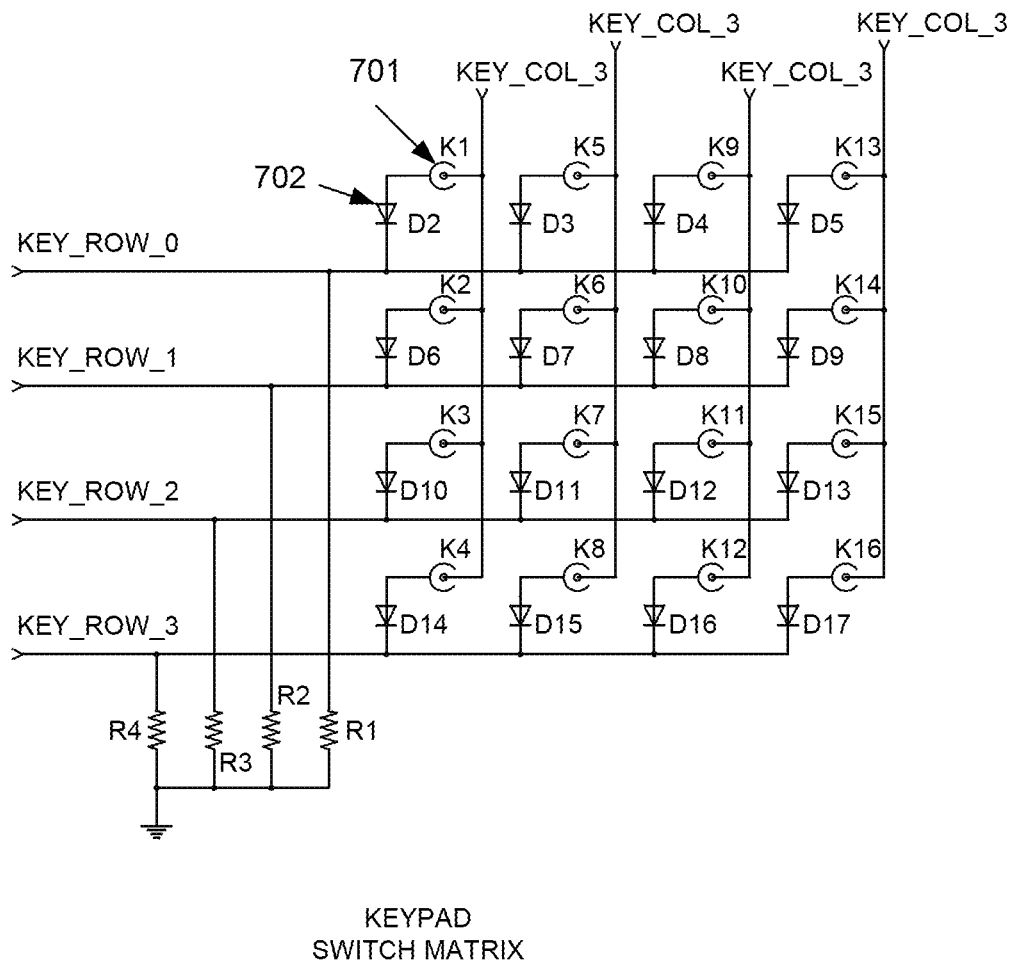
FIG. 7 is a schematic of an example of a keypad switch matrix for use in the keypad of FIG. 5.

The microcontroller 601 program scans the rows and columns of the keypad button matrix by sequentially setting one of the Key_Col_0 through Key_Col_3 output pins to a logical '1' (+5V) while the others are set to a logical '0' (0V). Each Key_Row_0 through Key_Row_3 input pins are read into a memory location indicating the current state of each of four buttons in the respective column. FIG. 7 depicts the keypad button matrix.

If a Scene button is pressed and held for greater than two seconds, the Mode field shall be toggled from a '0' to a '1' or a '1' to a '0' to indicate the mode is in Programming or Normal mode respectively. The Scene button initiating the Programming mode shall be reported to the Master Dimming Controller in the Keypad Data Payload.

The microcontroller 601 program periodically reports the following Keypad data shown in TABLE 1 below to the Master Dimming Controller:

TABLE 1

Keypad Data Payload

| Field | Position | Type | Value | Notes |
|---|---|---|---|---|
| Target Light Fixture ID | 0 | Bits(3-0) | 0x0-0xf Default = 0x0 | Lighting Fixture ID |
| Mode | 0 | Bit(7) | 0 = Normal 1 = Program | |
| Program Scene Number | 1 | UINT8 | 1-16 | Scene Button number initiating program mode |
| Current Button State | 1-2 | Bit(0) = K1, Bit(1) = K2, ... Bit(15) = K16 | 0 = Not Pressed 1 = Pressed | |
| Previous Button State | 3-4 | Bit(0) = K1, Bit(1) = K2, ... Bit(15) = K16 | 0 = Not Pressed 1 = Pressed | |

FIG. 7 is an example of a common industry practice combining a plurality of switches into a matrix of rows and columns to reduce the total number of I/O pins required to read each switch. In this example, switch contact 701 forms a unique switch (button). Isolation diodes 702 allow the microcontroller to detect multiple simultaneous switch closures. Detecting two or more simultaneous switch closures allows the microcontroller to implement alternative functionality.

Figure 8:
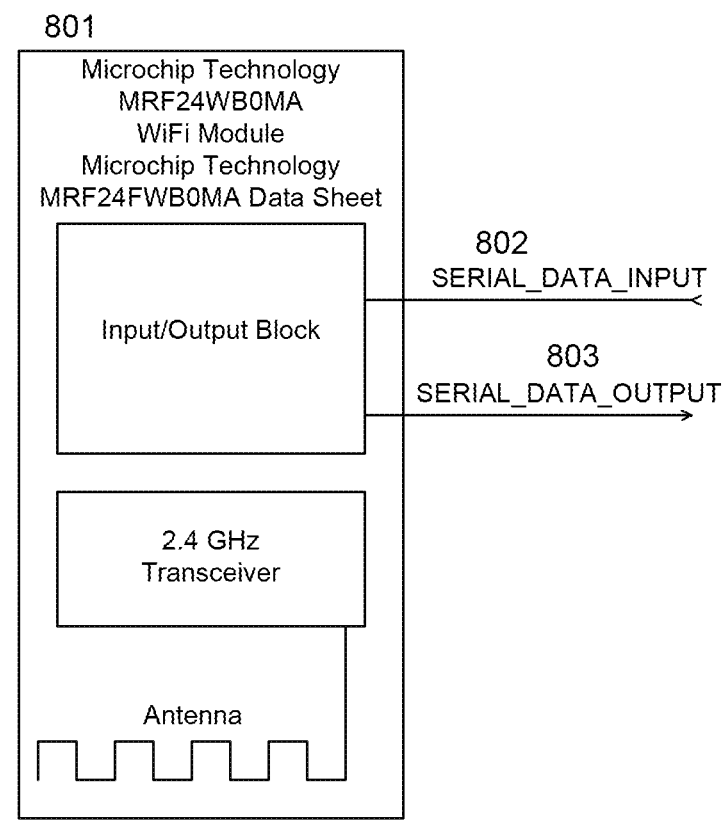
FIG. 8 is a schematic of an example of a wireless communications module for use in the keypad of FIG. 5.

FIG. 8 is an implementation of the keypad to use a Master Dimmer Controller communications link using, for example, an industry standard Wi-Fi 802.11b communications module 801, Microchip Technology part number MRFWB0MA. The MRFWB0MA module is controlled by the keypad microcontroller 601 via an industry standard SPI serial data interface port. The module 801 has serial data input port 802 and serial data output port 803.

Figure 9:
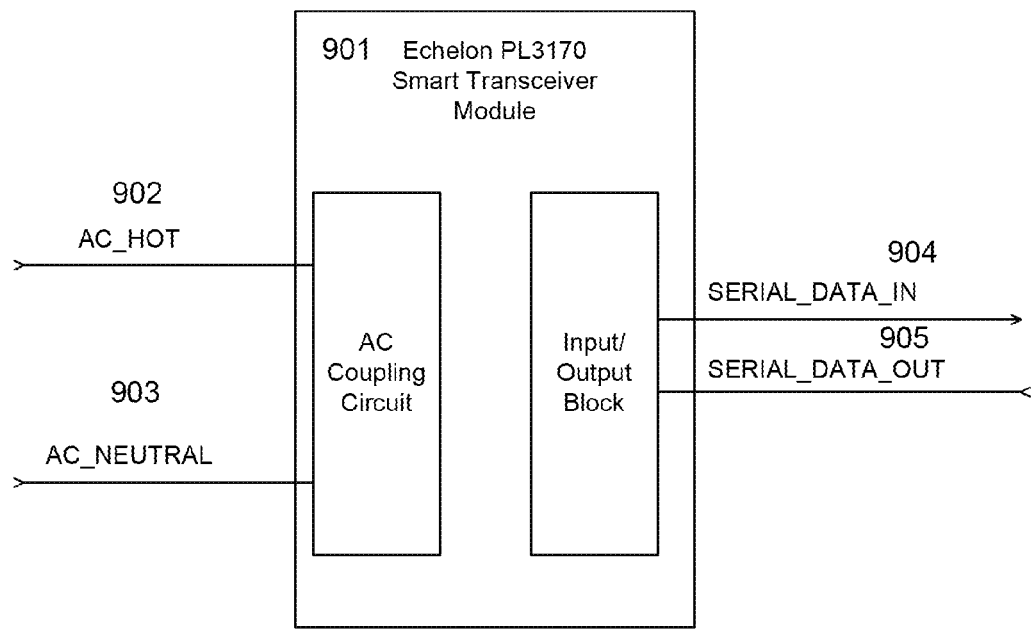
FIG. 9 is a schematic of an example of a powerline communications module for use in the keypad of FIG. 5.

FIG. 9 is an implementation of the keypad to use a Master Dimmer Controller communications link implemented using Echelon Corporation's Power Line Communications technology, Echelon P/N PL3170. The PL3170 power line module is controlled by the keypad microcontroller 601 via an industry standard SPI serial data I/O interface port 904, 905.

Figure 10:
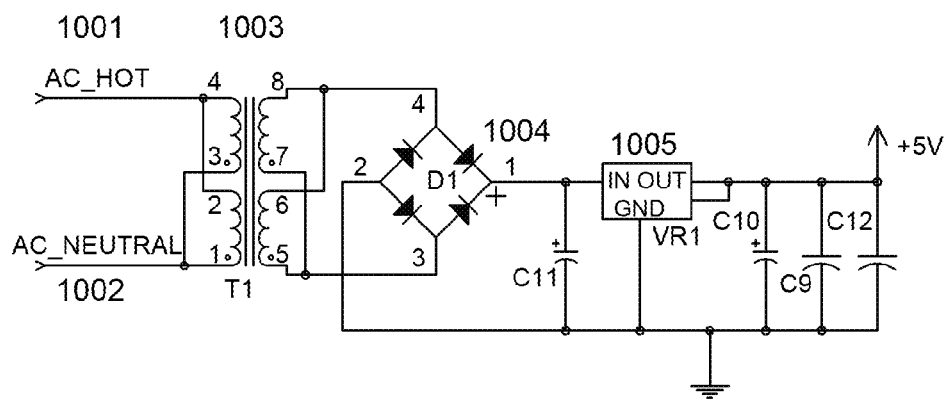
FIG. 10 is a schematic of an example of a keypad power supply for use in the keypad of FIG. 5.

FIG. 10 is a commonly used power supply implementation. Transformer 1003 reduces the 110 volt A.C. input via lines 1001, 1002 to 10 volts. A.C. Bridge rectifier 1004 and capacitor C11 convert the A.C. voltage to an unregulated, filtered D.C. voltage. The linear voltage regulator 1005 converts the unregulated D.C. voltage to a fixed +5 volt output to power the remaining keypad components.

Figure 11:
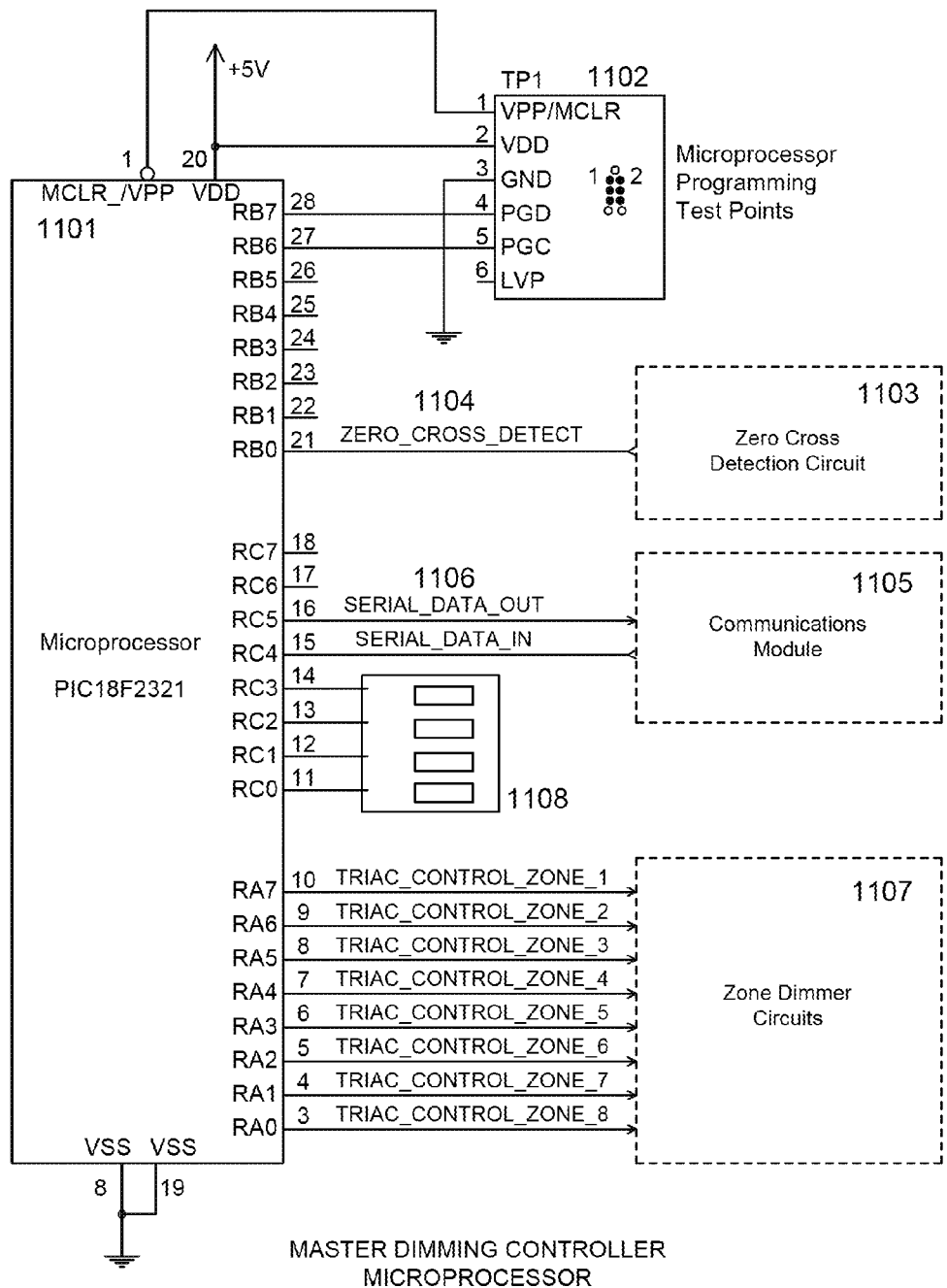
FIG. 11 is a schematic of an example of a master dimming controller microprocessor for use as the scene controller in the embodiments of FIGS. 3 and 4.

FIG. 11 is a block diagram of a Master Dimming Controller. This exemplary implementation uses a Microchip Technology PIC18F2321 microcontroller 1101. The microcontroller 1101 receives the keypad switch state data via the Communications Module 1105. The serial data interface 1106 is an industry standard SPI serial data interface.

Up to 16 Master Dimming Controller lighting fixtures can be controlled with a single Keypad. In a multiple Master Dimming Controller lighting fixture environment, each lighting fixture's ID "DIP" switch 1108 is set to a unique four binary bit combination. The default setting for the "DIP" switch is 0000.

The microcontroller 1101 has internal non-volatile EEPROM memory which stores the illumination level for each of the dimming zones 1107. In the event of a power failure optionally all zones will return to the factory settings.

The Master Dimming Controller microcontroller either polls for or is interrupted by the communication module's reception of a Keypad data payload. Upon receipt of the payload, the Master Dimming Controller compares the received "Target Light Fixture ID" to the value of the DIP Switch 1108. If the values match, the Master Dimming Controller parses the remainder of the received data payload.

The bitwise comparison of exclusive OR'ing (XOR) of the Current Button State and Last Button State to the respective Current Button State determines whether the Current Button State is the result of a make, break or steady state condition of a specific button as shown in TABLE 2:

TABLE 2

| Current Button State Bit (Kx) | Bitwise XOR Bit (Kx) | Notes |
|---|---|---|
| 0 | 0 | Released |
| 0 | 1 | Break |
| 1 | 0 | Pressed |
| 1 | 1 | Make |

Scene Selection

If the Keypad Data Payload bit field "Mode" is set to zero and a Scene Keypad button indicates a "Make" condition, the Controller retrieves the respective Scene's Zone illumination from the non-volatile and sets all zone illumination levels respectively. If more than one Scene Button is determined to be in the "Make" condition, the remaining Scene Buttons are ignored.

Scene Programming

If the Keypad Data Payload bit field "Mode" is set to '1', programming mode is enabled. The keypad switches K1-K5 are remapped to different functions as shown in TABLE 3 below.

1. The Keypad Data Payload field "Program Scene Number" specifies which of 16 possible scenes is to be programmed based upon the last Scene button pressed for greater than two seconds.

2. Target Lighting Fixture Selection: The Scene 1 buttons is now remapped and causes the Keypad to rotate through each of the 16 valid Target Lighting Fixture ID values each time the button is pressed. Each time the button is pressed, the corresponding lighting fixture will flash all of its lamps for a period of about one second.

3. Zone Selection: The Scene 2 button is now remapped and causes the Controller to rotate through each of the valid Zones each time the button is pressed. During programming, only the selected zone lamps will be illuminated.

4. Zone Illumination Level: The Scene 3 and Scene 4 buttons are now remapped to increase or decrease the lighting level for the selected zone with each respective button press. Upon release of a button press, the then current zone illumination level will be stored in the respective Scene and Zone non-volatile microcontroller memory location.

5. Additional lighting zones may be programmed as shown in steps 3 and 4 above.

6. Additional Target Lighting Fixtures may be programmed as shown in steps 2, 3, and 4 above.

7. Programming Exit: Press and hold any Scene button for greater than two seconds.

TABLE 3

Keypad Button Function Mapping

| Button | Normal Mode | Programming Mode | Notes |
|---|---|---|---|
| K1 | Scene 1 | Select Target Lighting Fixture ID | Press to increment ID #; All zones on targeted ID will flash for one second |
| K2 | Scene 2 | Zone Select | Press to select Zone; only selected zone will be illuminated. |
| K3 | Scene 3 | Zone Brighter | |
| K4 | Scene 4 | Zone Dimmer | |
| K5-K16 | Scene 5-Scene 16 | N/A | |

Figure 12:
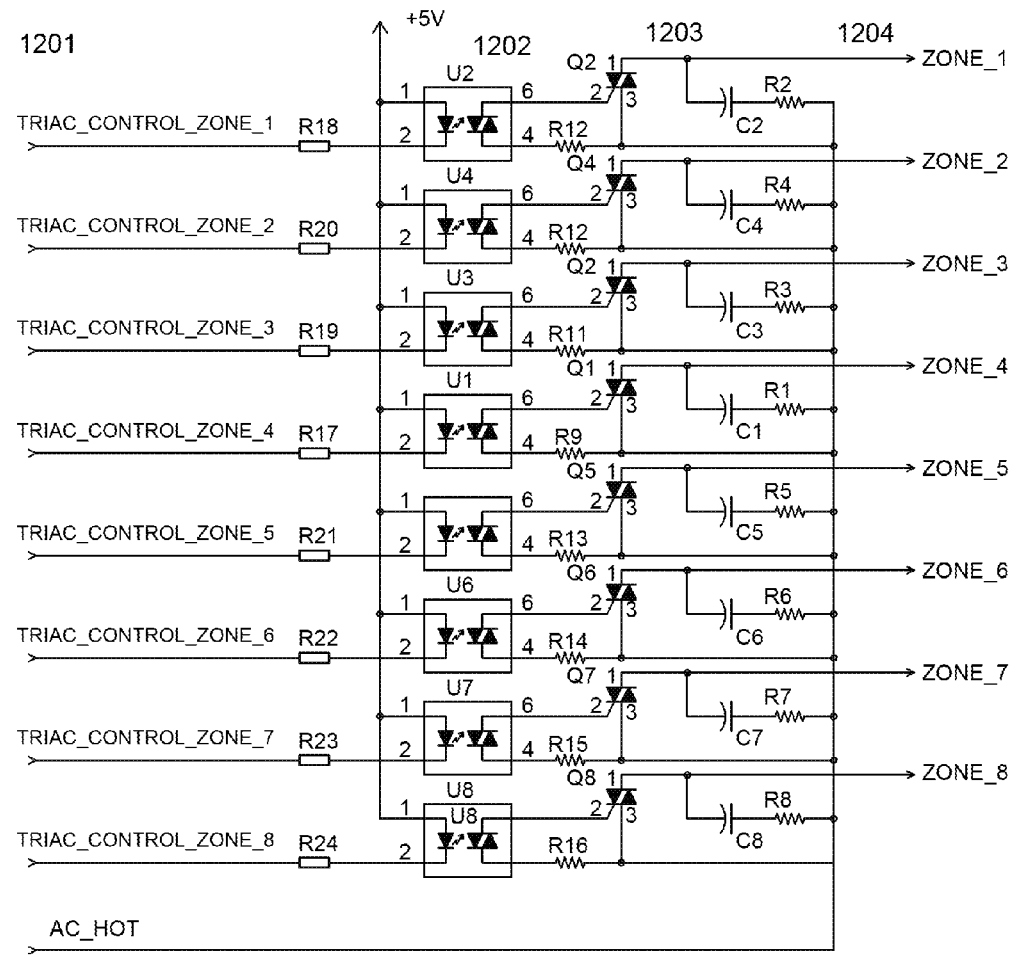
FIG. 12 is a schematic of an example of an array of zone dimmer circuits used in the master dimming controller microprocessor circuit of FIG. 11.

FIG. 12 depicts industry standard dimming control of A.C. line voltages. Each dimming zone is controlled by a semiconductor device known in the industry as a triac. When the triac control signal 1201 is set by the microcontroller to zero volts, the optically isolated triac driver 1202 triggers the gate of the triac 1203, turning the triac switch on. A triac inherently turns off upon the next occurring zero crossing of the A.C. voltage cycle if the triac gate is not triggered.

Dimming of a lamp is accomplished when a pulse is applied to the triac's gate at some time after a zero crossing of the A.C. signal. If the triac pulse is shorter that the total time of the A.C. half cycle period, the triac will inherently turn off. Thus, the triac is only on for a portion of a half cycle of the A.C. line voltage. The reduction in total power applied to a lamp results in a lower light output. The use of triacs for dimming is compatible with all incandescent lamps and newer generation compact florescent lamps/L.E.D sources.

In this example, the microcontroller generates a triac trigger control pulse signal 1201 N microseconds after the Zero_Cross_Detect interrupt. The Full illumination is achieved when the dimming delay=1. Illumination decreases proportionally as the delay increases. A dimming delay=0 is reserved to indicate the zone is Off.

Ceiling fan motor speed and direction control is implemented by repurposing two dimming zones. In an implementation, one dimming zone is designated as the Fan Speed Zone. A second dimming zone is designated as the Fan Direction Zone.

A lamp dimming zone is repurposed as a Fan Direction A.C. switch by setting the triac control signal 1201 to a steady state of either '1' or '0'. When the triac control signal is a '1', the zone output 1204 is OFF; When the triac control signal 1201 is a '0', the zone triac 1204 ON. The Fan Direction Zone control power to the coil of single pole double throw (S.P.D.T.) relay (not shown). The relay's Common contact is connected to the Fan Speed Zone. The relay's Normally Open and Normally Closed contacts are connected to the ceiling fan motor's forward and reverse direction windings. If the Fan Direction Zone is ON, the ceiling fan rotates in the one direction. If the Fan Direction Zone is OFF, the ceiling fan rotates in the opposite direction.

The Fan Speed Zone controls the ceiling fan motor speed in the same manner as dimming a lamp, i.e. the triac is turned on only during a portion of the A.C. cycle, reducing the average power applied to the motor. As the average power decreases, the motor speed decreases.

Figure 13:
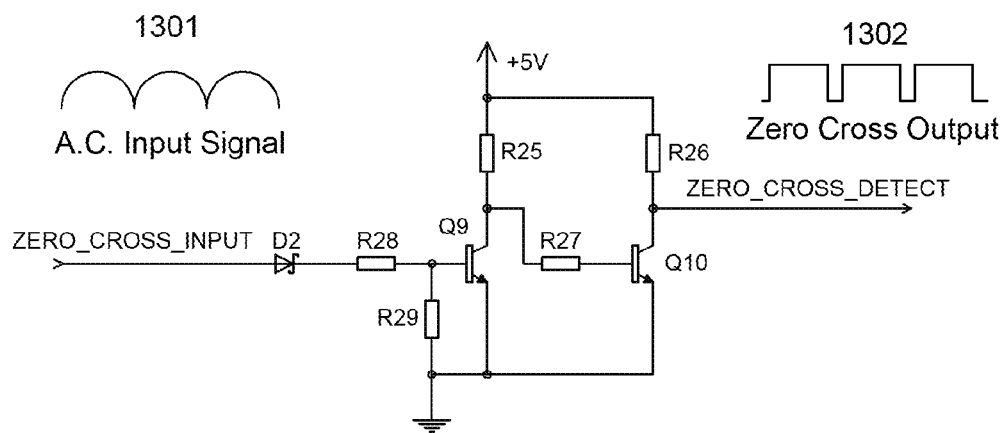
FIG. 13 is a schematic of an example of zero cross detection circuit used in the master dimming controller microprocessor circuit of FIG. 11.

The Zero Cross Detection Circuit in FIG. 13 generates a pulse 1302 every half cycle when the rectified A.C. voltage 1301 is above zero volts. Upon the rising edge of the Zero_Cross_Detect pulse, an interrupt is generated within the microcontroller indicating the beginning of each dimming control cycle.

Figure 14:
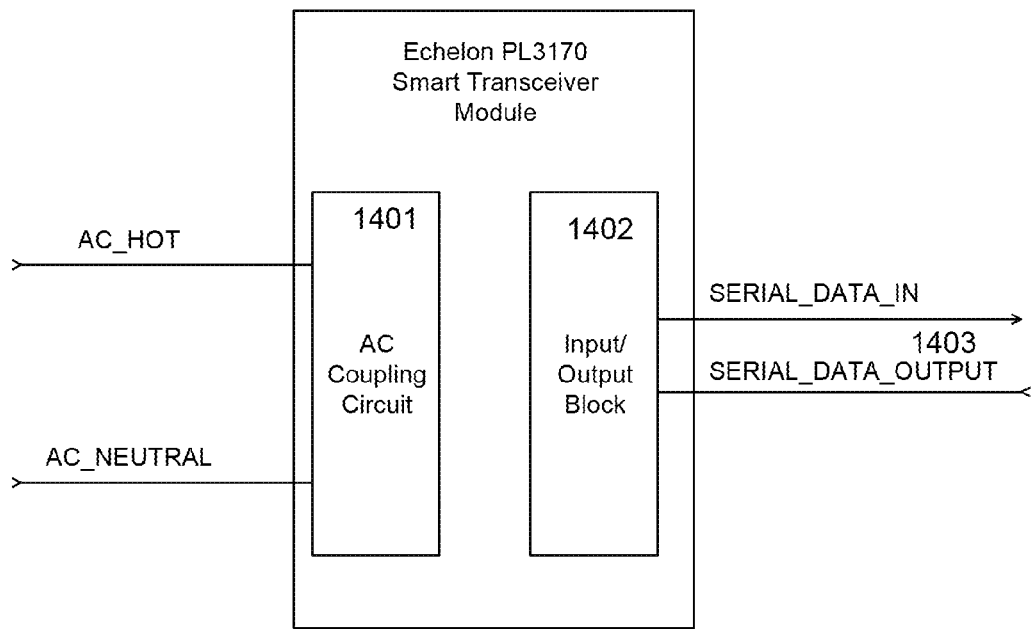
FIG. 14 is a schematic of an example of a powerline communications module for use in the master dimming controller of FIGS. 3 and 4.

FIG. 14 is an implementation of the Master Dimmer Controller to use a Keypad communications link implemented using Echelon Corporation's Power Line Communications technology, Echelon P/N PL3170. The PL3170 module is coupled to the A.C. power line via an A.C. coupling circuit 1401 and is controlled by the keypad microcontroller via an industry standard SPI serial data I/O interface port 1402, 1403.

Figure 15:
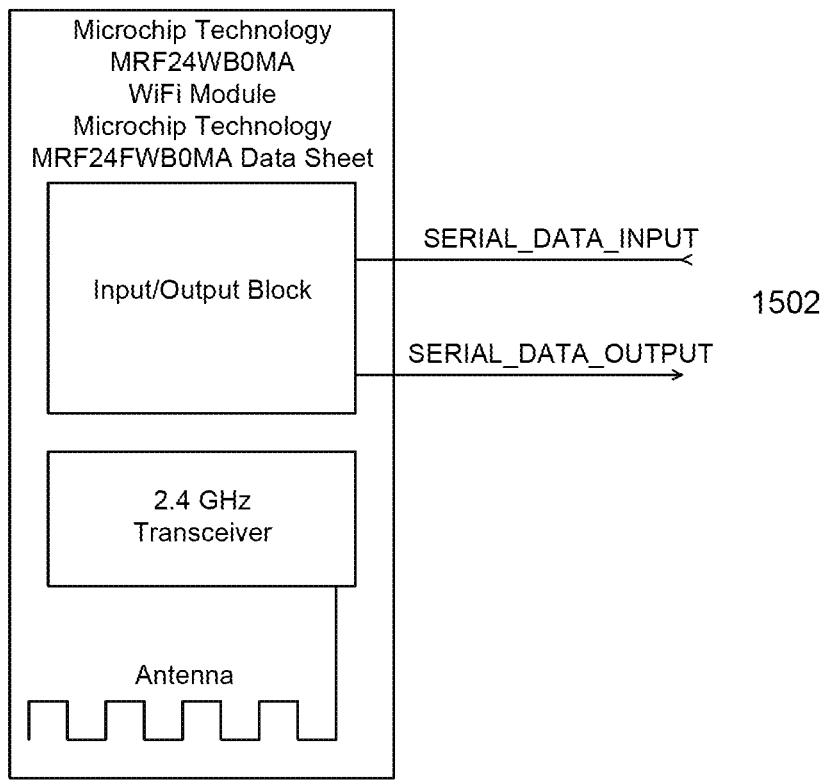
FIG. 15 is a schematic of an example of a wireless communications module for use in the master dimming controller of FIGS. 3 and 4.

FIG. 15 is an implementation of the Master Dimmer Controller to use a Keypad communications link using an industry standard Wi-Fi 802.11b communications module 1501, Microchip Technology part number MRFWB0MA. The MRFWB0MA module is controlled by the keypad microcontroller 601 via an industry standard SPI serial data I/O interface port 1502.

Figure 16:
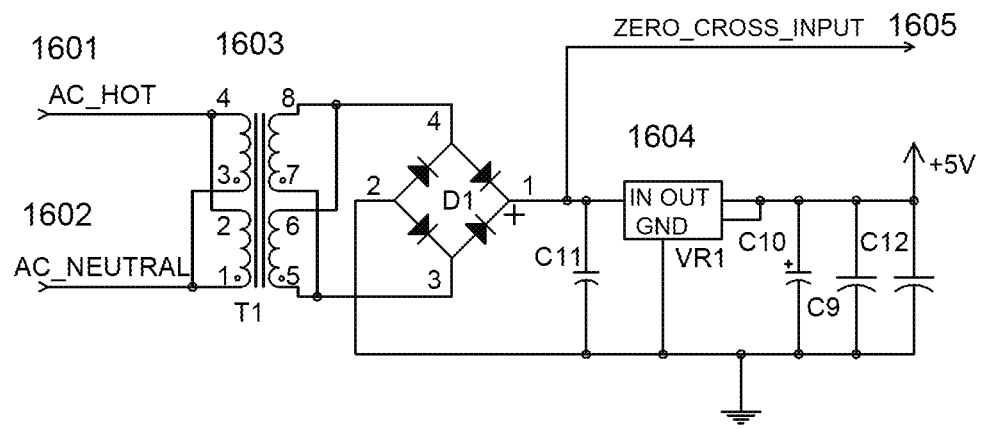
FIG. 16 is a schematic of an example of a power supply for use in the master dimming controller of FIGS. 3 and 4.
Figure 17:
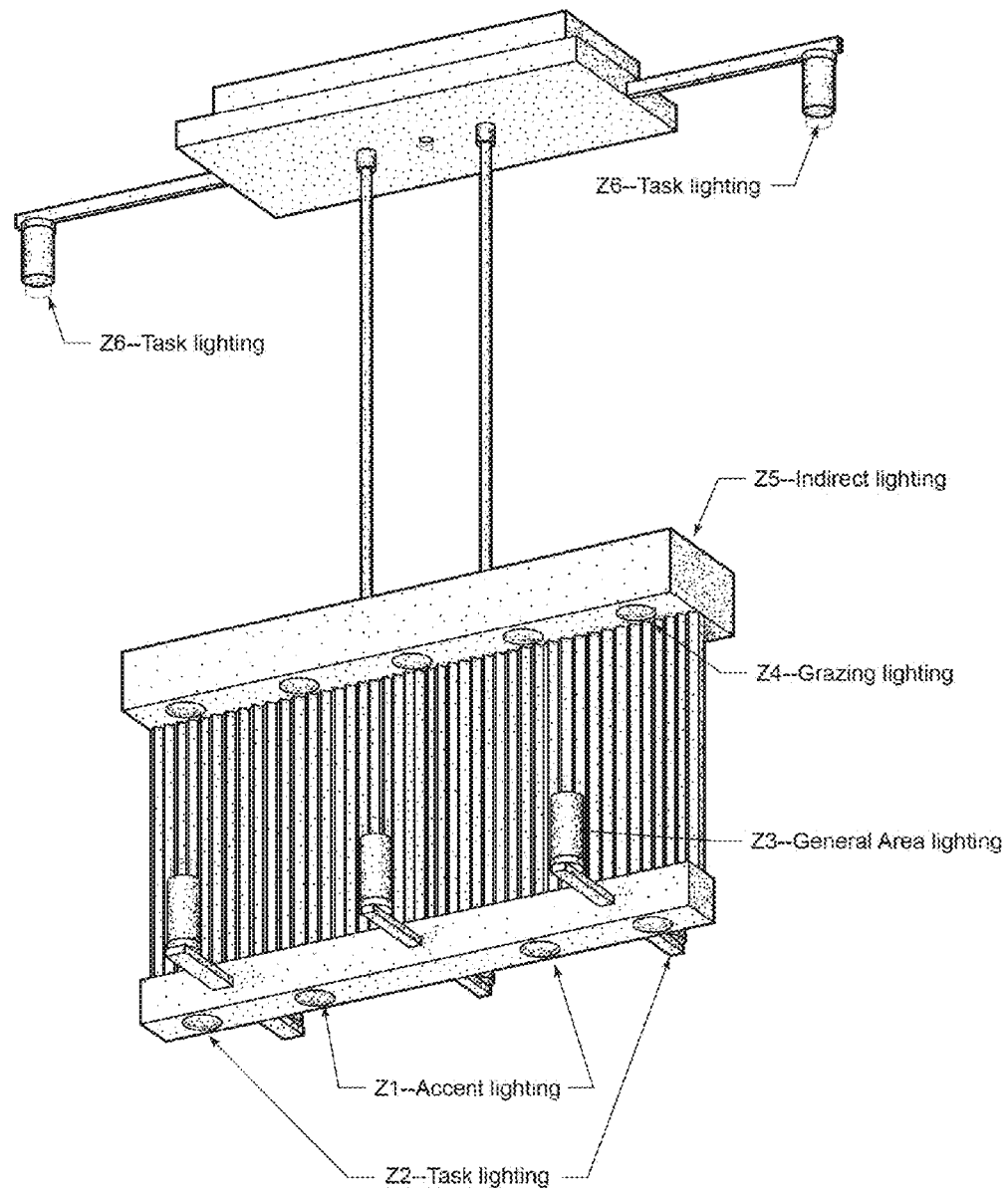
FIG. 17 is a perspective view of one embodiment of a lighting device, in this case a modern-style chandelier, incorporating multiple zones of lighting in a single support structure to create different scenes based on different combinations of the various zones and their settings in accordance with the invention.
Figure 18:
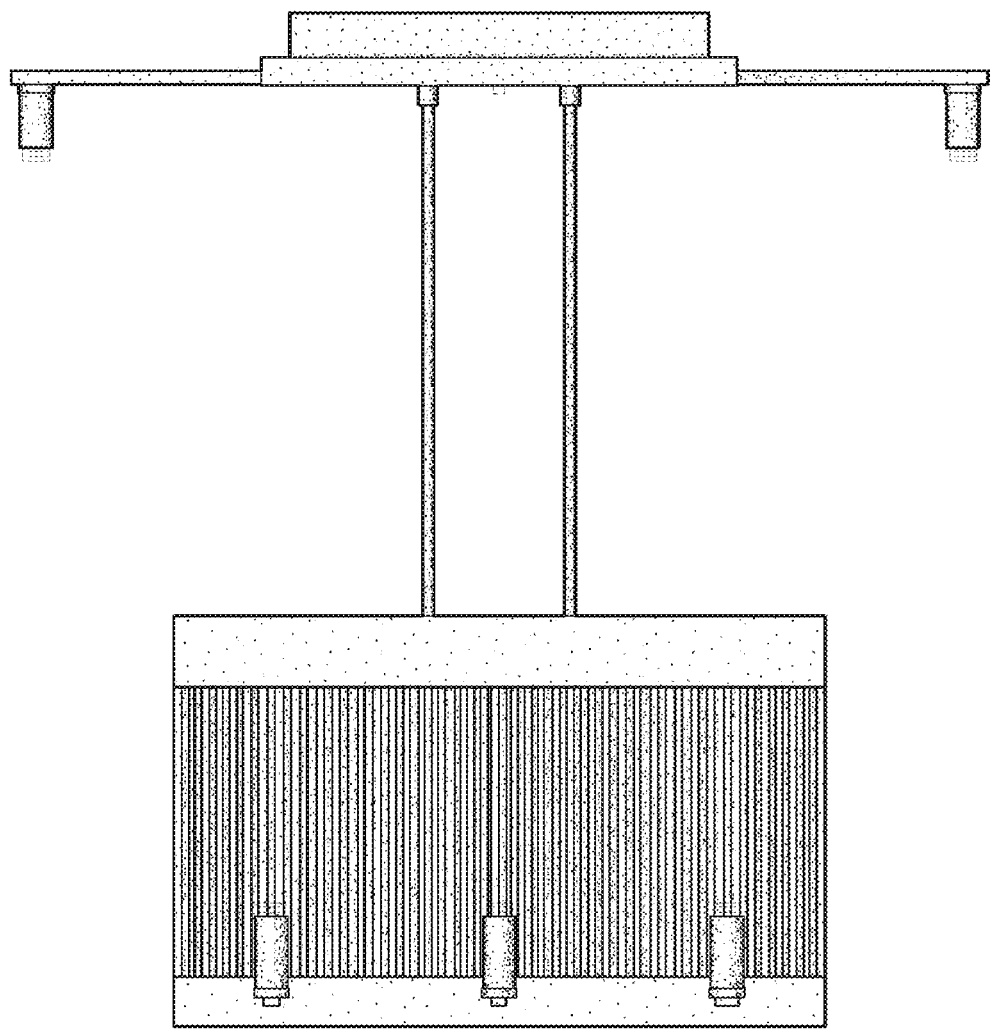
FIGS. 18 and 19 are side and end elevation views of the lighting device of FIG. 17.
Figure 19:
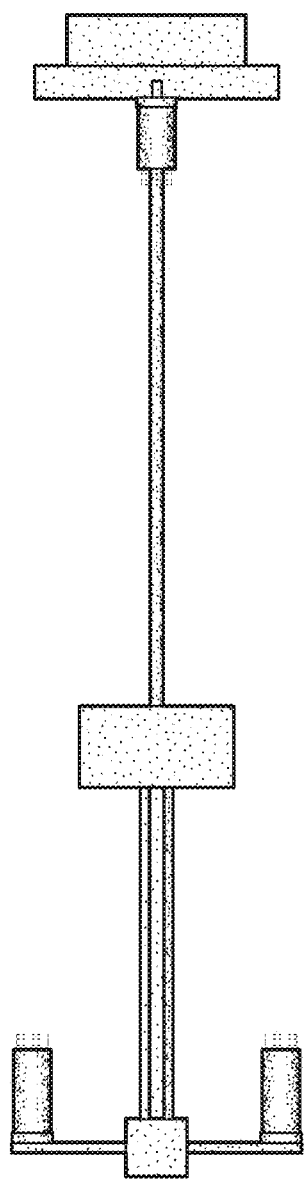
Figure 20:
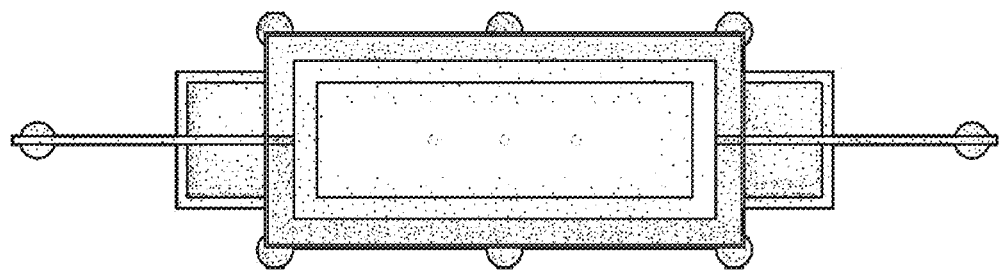
FIGS. 20 and 21 are top and bottom plan views of the lighting device of FIG. 17.
Figure 21:
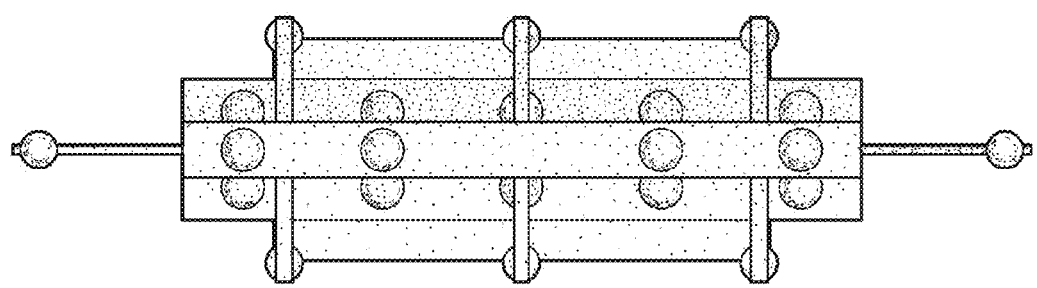
Figure 22:
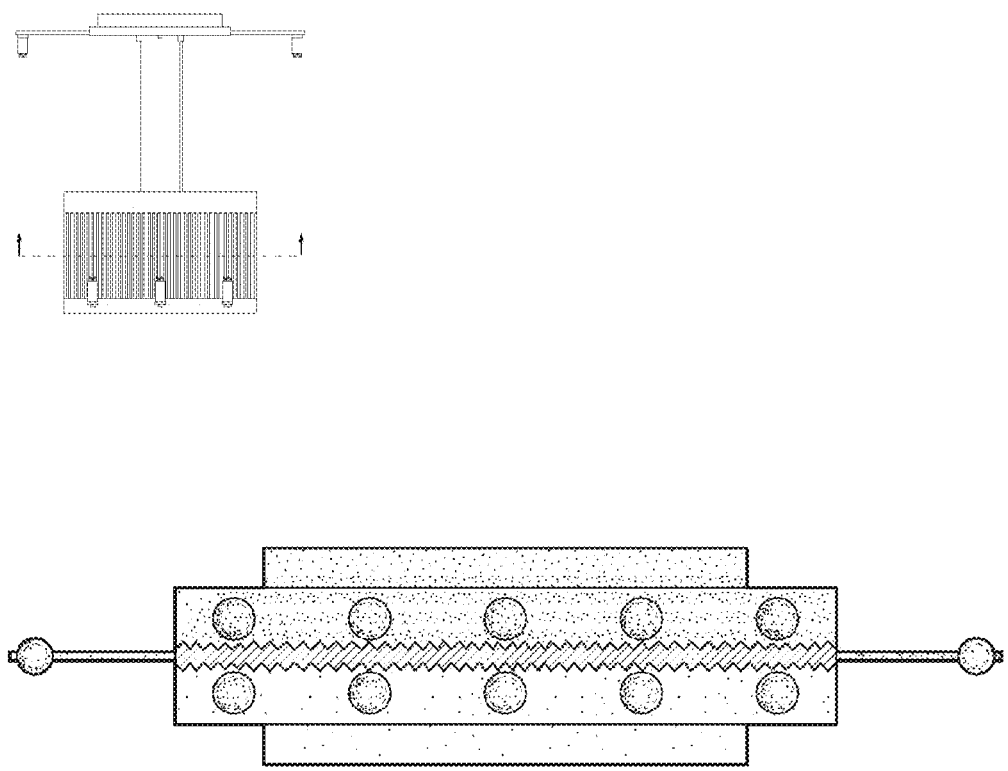
FIG. 22 is a cross-sectional view of the lighting device of FIG. 17.
Figure 23:
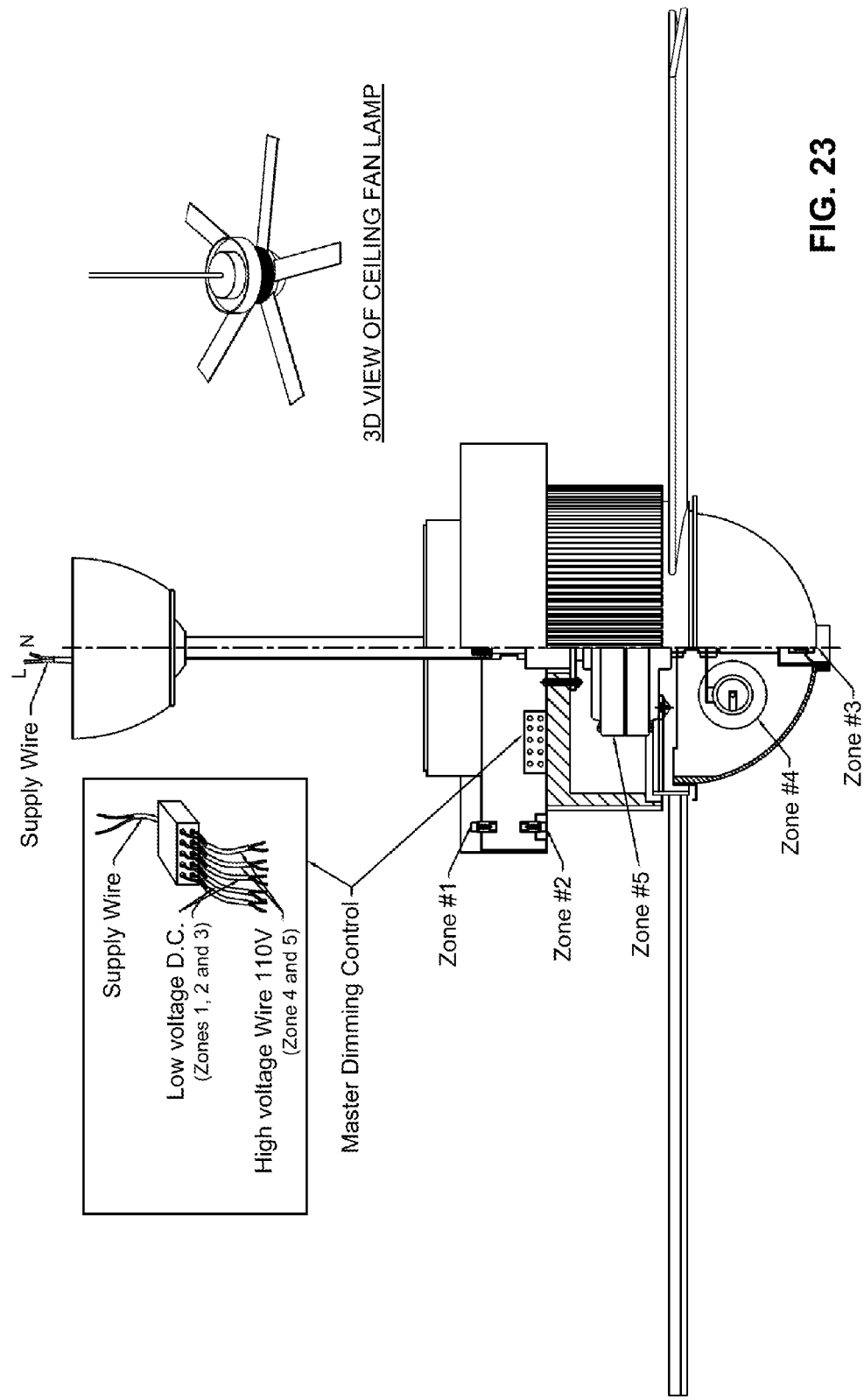
FIG. 23 is a side-elevation view of a second embodiment of a lighting device according to the invention, in this case the support structure of a ceiling fan-lamp, with partial cutaways to show interior structure.
Figure 24:
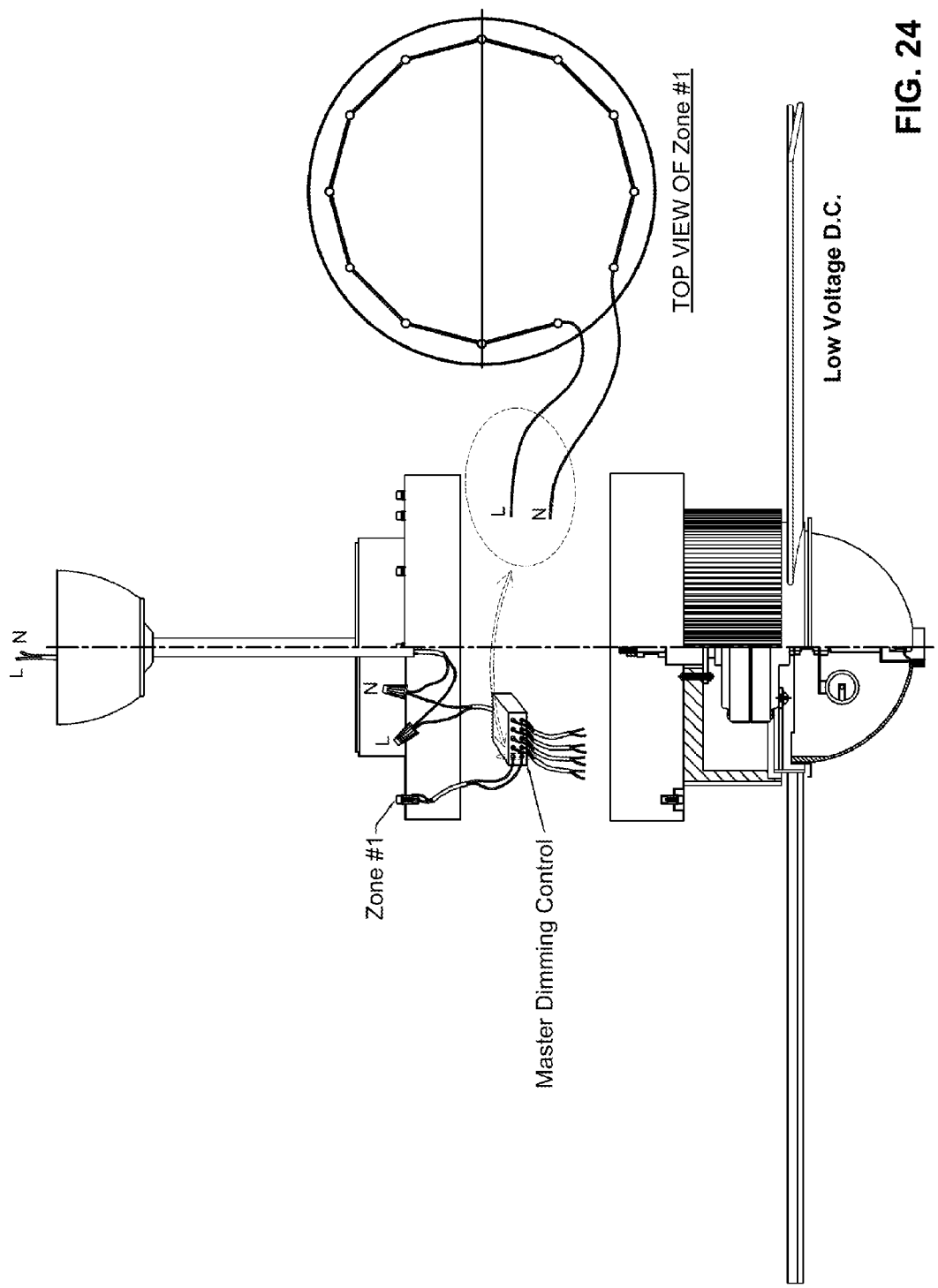
FIGS. 24-28 are elevation views similar to FIG. 23 showing details of wiring from the master dimming controller to each of the zones.
Figure 25:
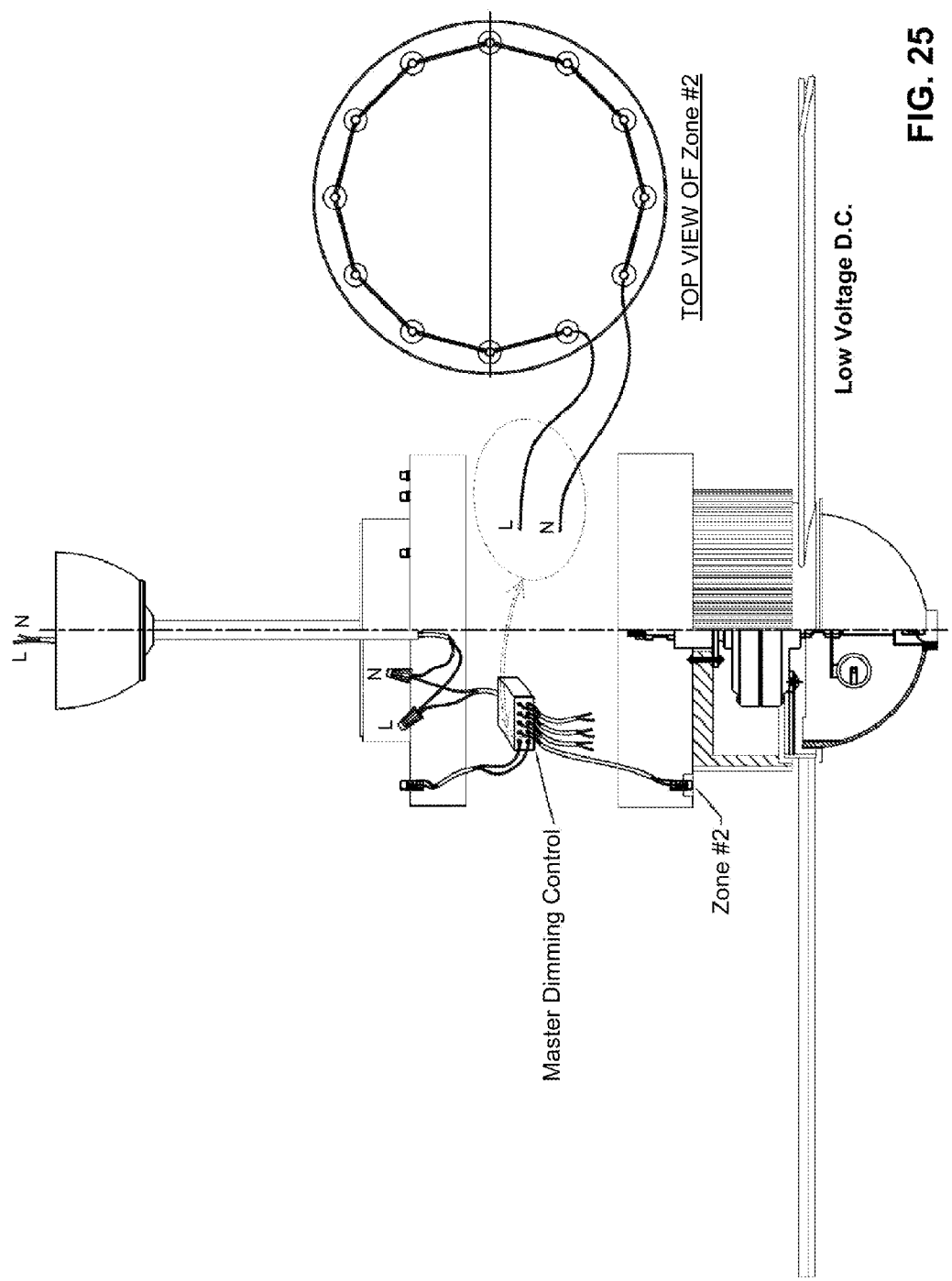
Figure 26:
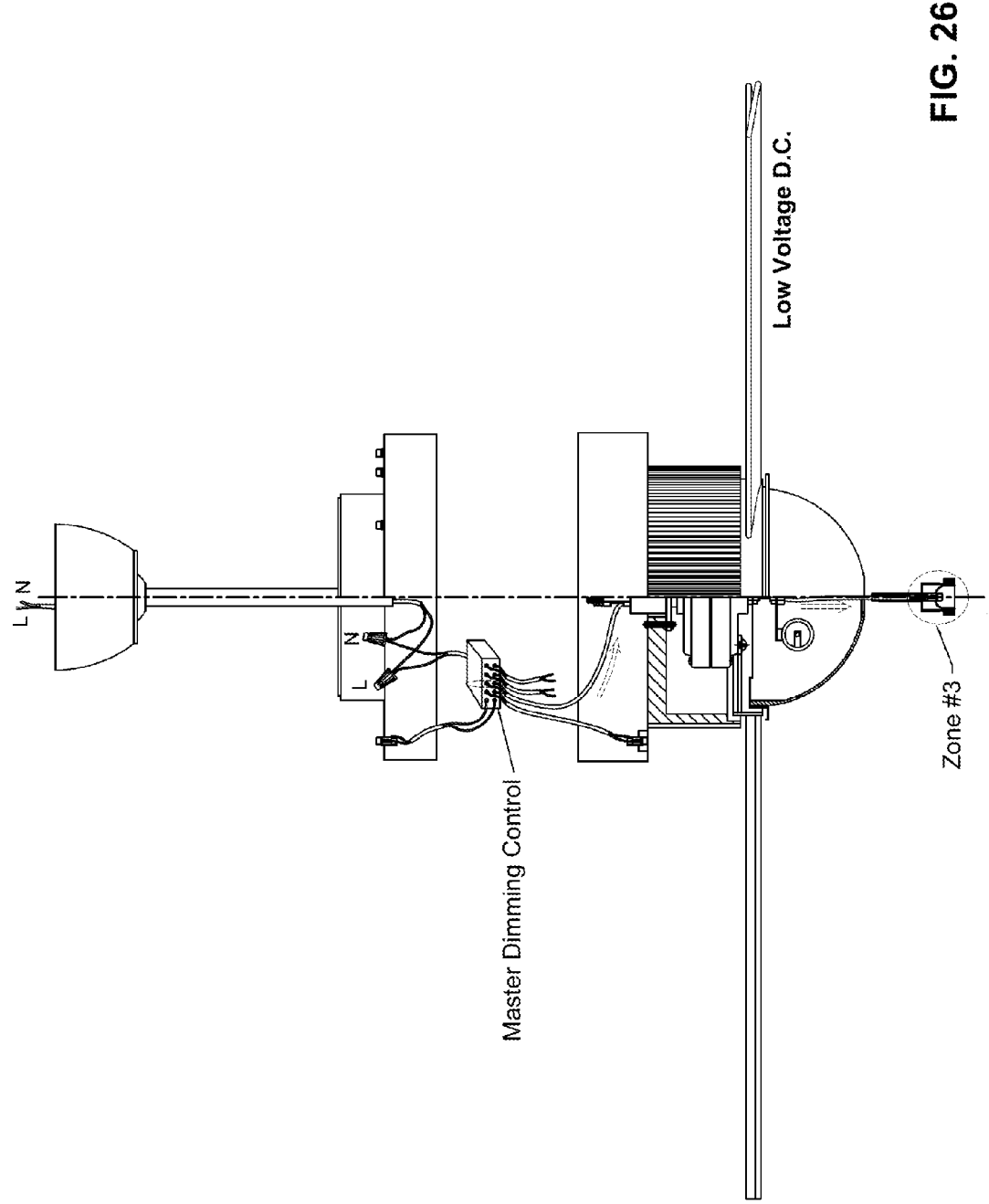
Figure 27:
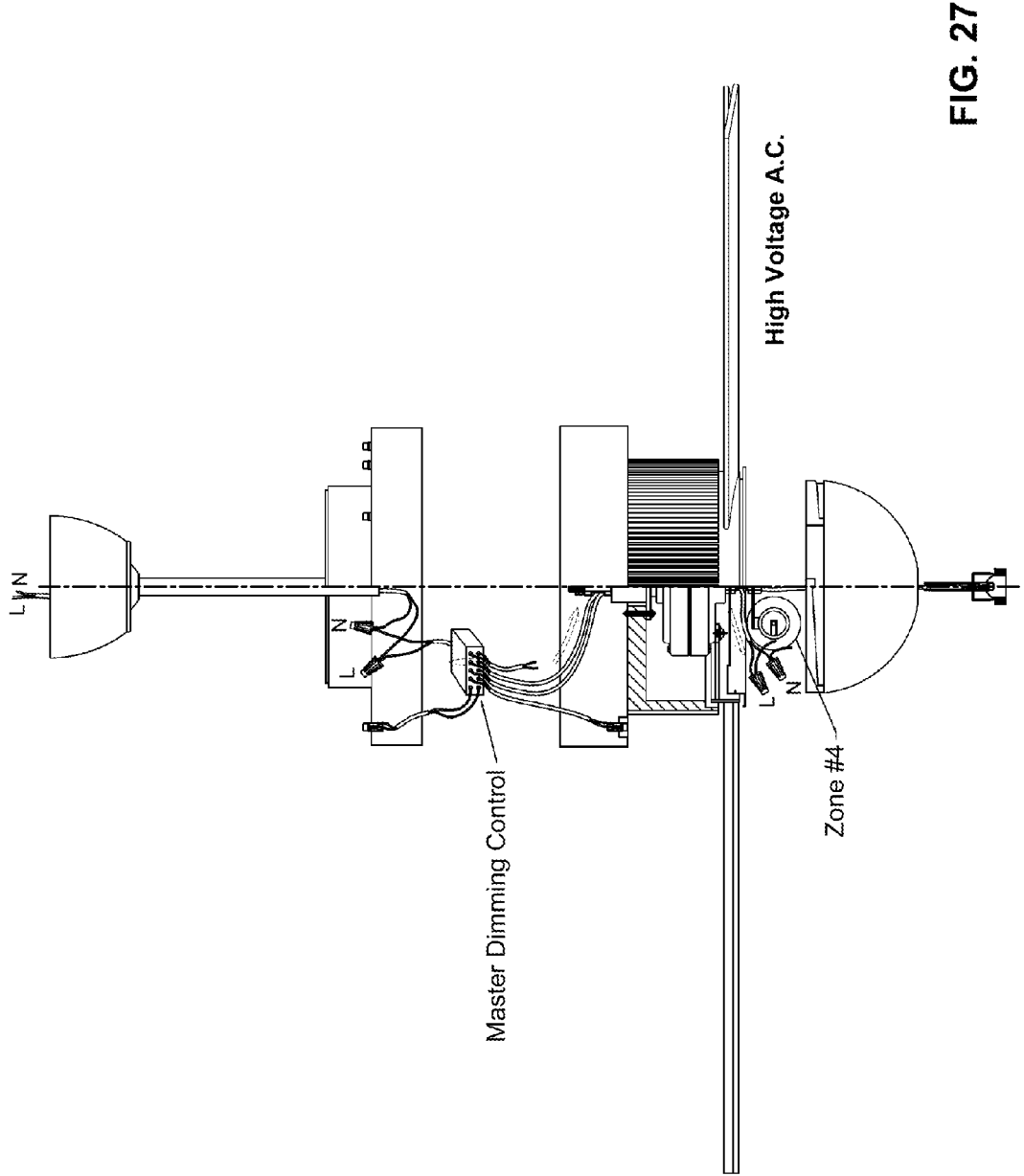
Figure 28:
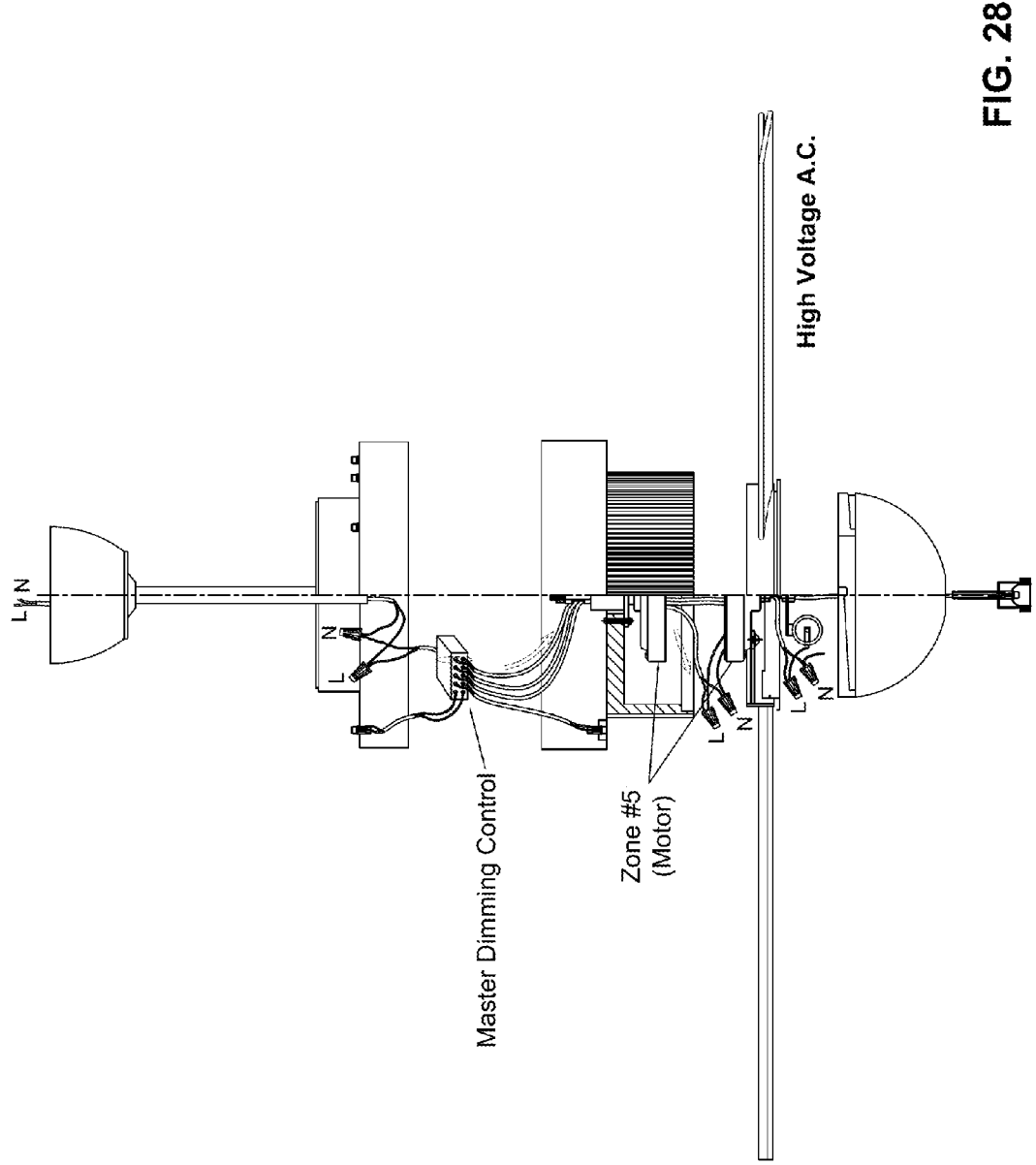

FIG. 16 is a commonly used power supply implementation that can be used in the disclosed lighting device. Transformer 1603 reduces the 110 volt A.C. input via lines 1601, 1602 to 10 volts. A.C. Bridge rectifier 1604 and capacitor C11 convert the A.C. voltage to an unregulated D.C. voltage. The linear voltage regulator 1605 converts the unregulated D.C. voltage to a fixed +5 volt output to power the remaining keypad components. A zero-crossing input signal 1605 is output from the rectifier for use as signal 1301 in FIG. 13.

In each embodiment of the lighting device there are lighting zones. These zones can be included in any combination to create a plurality of scenes, preferably four to six scenes. For example, in a dining room application, it is common for the house wiring to allow for only one chandelier in the room, providing general lighting. When operated at full brightness, this chandelier causes an excessive amount of glare. It would be desirable to pre-set the general lighting function of the chandelier at less than full brightness to reduce glare while also providing accent lighting, indirect lighting and/or task lighting from the same chandelier.

Each remote controller has numerous scene buttons. By selecting a specific scene on one of the remote controllers, one or more zones are dimmed or one or more zones are raised in light intensity and one or more zones are turned on or off, one or more zones are dimmed or turned off while other zones increased in light intensity. Each of the scenes and fade rates of each of the scenes is pre-programmed at the factory but can be re-programmed via the remote controller.

Another desired option is a display mode, in which the scenes cycle, staying a pre-determined time such as 15 seconds at each scene and then fading to the next scene. Another option would be a security mode which could be programmed to come on at certain times of the night or a pre-selected scene would come on 30 seconds after outside motion lights or sensors were activated. This would only happen in the away mode.

Following are three examples of lighting devices implementing the present invention.

Example 1

FIGS. 17-22 show a modern-style chandelier incorporating six zones of lighting fixtures. Each of these zones is connected to and controlled by a master dimming controller, as previously described, mounted in the ceiling base. Zone 6 Task lighting is powered from the controller through A.C. power lines extending through the base and the oppositely extending arms to the fixtures. Zones 1 through 5 are powered by separate lines extending from the master dimming controller in the base through tubes that suspend the main body of the chandelier from the base. The main body of the chandelier in this example has upper and lower cross beams interconnected by a web. Zones 1 and 2 are downwardly directed lamps, which may be aimable, to provide accent lighting and task lighting. Zone 3 has six upward-directed lamps to provide general area lighting. The upper bar includes ten Zone 4 lamps, best seen in FIG. 22, that are downward directed and spaced close to the web to providing grazing lighting on the face of the web which may be grooved to create artistic light effects. The upper bar also includes Zone 5 lamps, best seen in FIG. 21 that are upward directed to illuminate the surrounding ceiling and thereby provide indirect lighting.

Example 2

FIGS. 23-28 show a ceiling fan lamp incorporating five zones: four zones of lighting fixtures (Zones 1-4) plus one zone (Zone 5) for the fan motor. Zones 1, 2 and 3 utilize low voltage lighting fixtures, which can be LEDs or high intensity lamps to provide different illumination effects, and are controlled by low voltage outputs from the master dimming control. Zone 4 is a high voltage zone to provide general illumination from an incandescent lamps. Zone 5 is the fan motor circuit, for which the master dimming controller can provide speed and direction controlled power signals.

Example 3

FIGS. 29-39 show another example of a chandelier with a master control dimming system. In this particular embodiment of my invention, the dimming system is in the base or canopy of the light fixture mounted to the fire-plate. In this embodiment, the chandelier uses the Echelon power line Smart Transceivers to communicate between the chandelier and a remote control dimmer, mounted in a wall box. A wireless handheld remote can also communicate with the master dimming control mounted within the canopy. (It is understood that other companies in addition to Echelon offer power line technology.)

Figure 29:
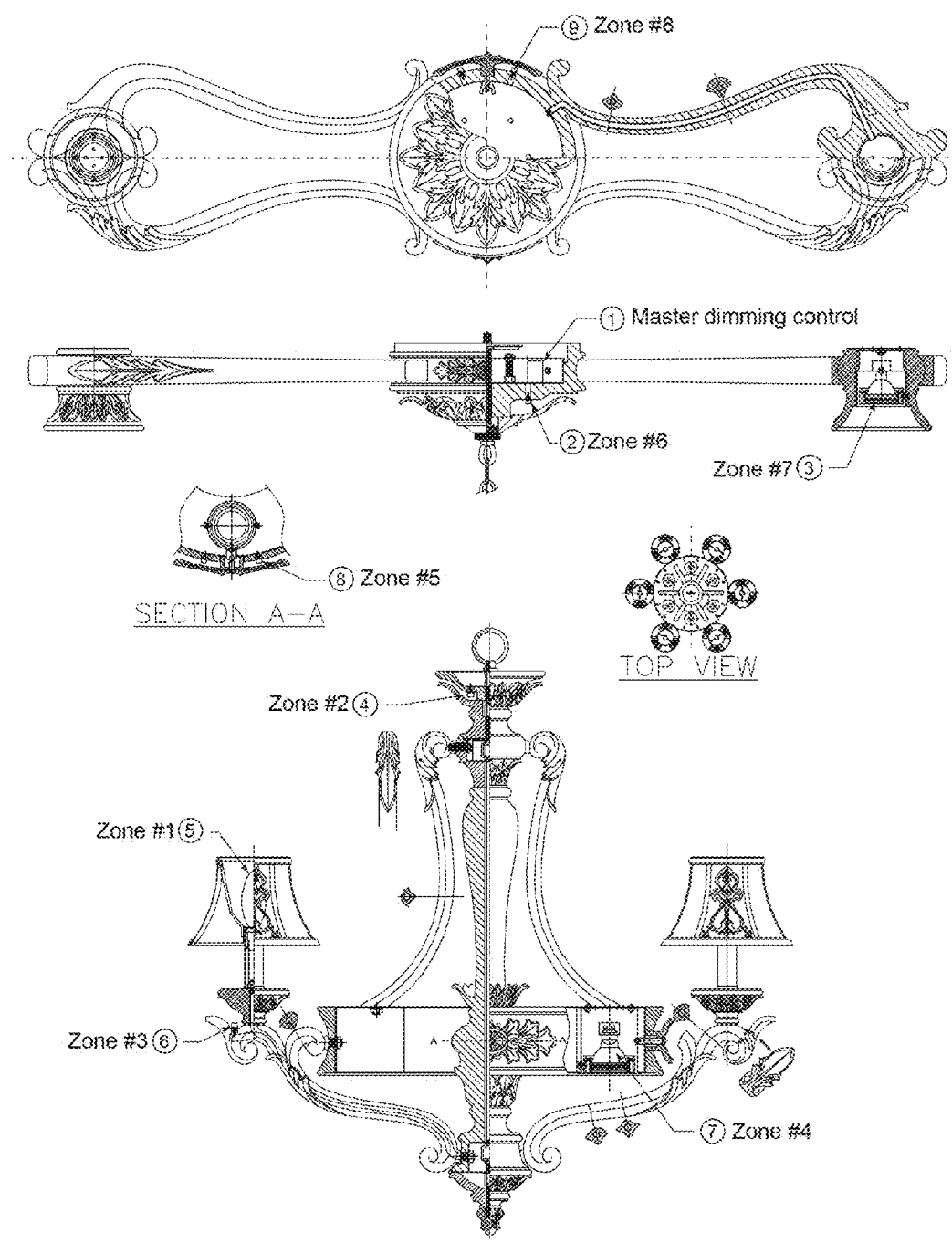
FIG. 29 is a composite of elevation and plan views of the elements of a third embodiment of a lighting device, in this case a classical-style chandelier, incorporating multiple zones of lighting in a single support structure, with partial cutaways to show interior structure.

In FIG. 29, this chandelier has 8 different zones. Each zone performs a different lighting effect such as in zone 1 general area lighting; in zone 2 indirect lighting near the top of the body of the chandelier; in zone 3 indirect lighting behind the decorative badges around the center decorative ring; in zone 4 task lighting; in zone 5 accent lighting under the chandelier's decorative ring; in zone 6 indirect lighting around and on the bottom side of the canopy; in zone 7 task lights on the upper arms extend in opposite directions from the canopy beyond the diameter of the body of the chandelier; and in zone 8 indirect lighting within the canopy.

The lights on the ends of the ceiling canopy arms (Zone 7) extend beyond the diameter of the chandelier so that their light beams are not blocked by the chandelier.

Figure 30:
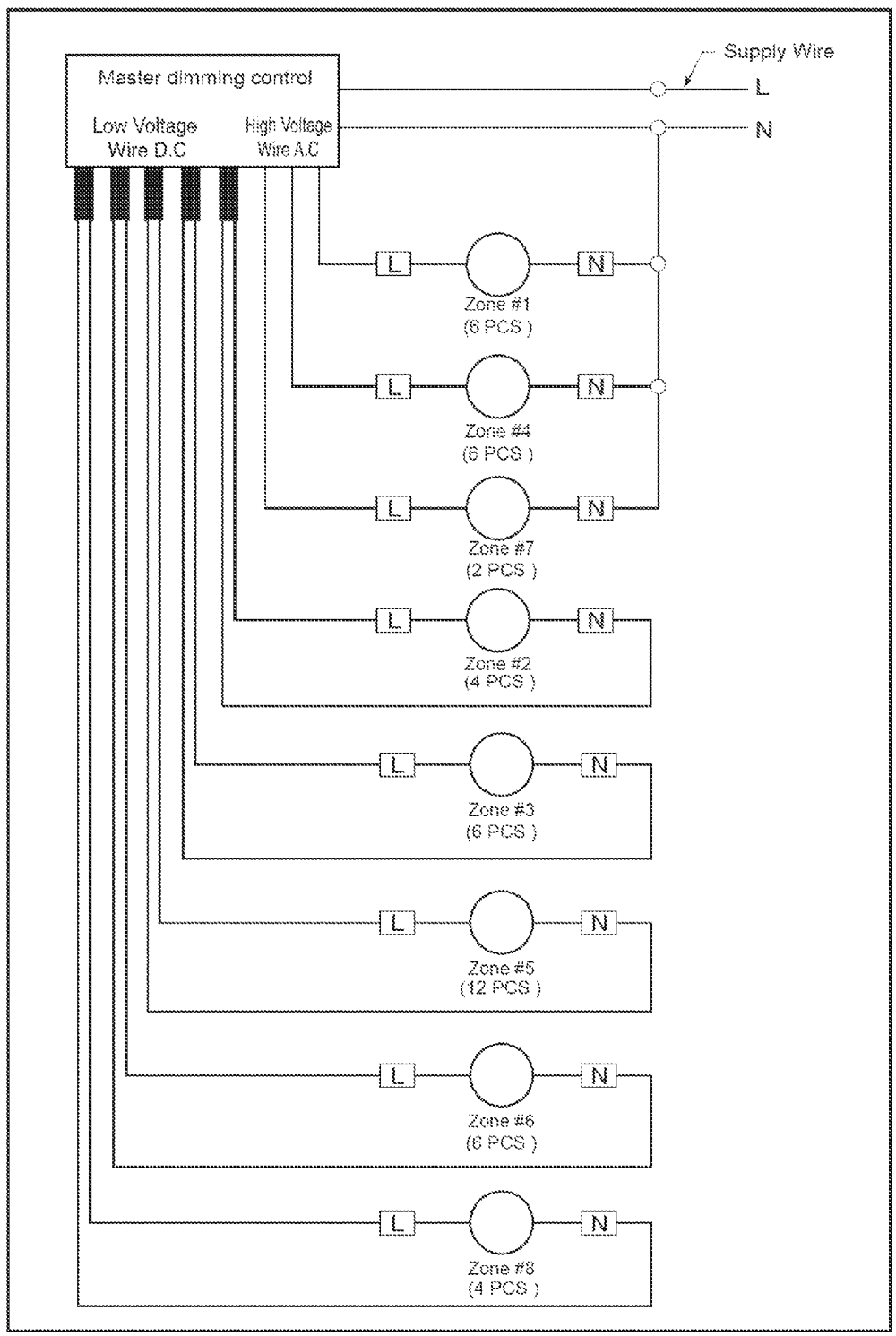
FIG. 30 is a wiring diagram for the lighting device of FIG. 29.

FIG. 30 is a schematic of wiring from the master dimming control to the various zones.

One hot wire from the master dimming control to each of the high voltage zones in the chandelier (Zones 1 and 4) plus one neutral wire and a ground wire are laced through the chain and fed through the screw collar loop and pipe nipple. The wires pass out of the pipe nipple in the electrical box and are connected to the master dimming control. One hot wire from each of the high voltage zones in the ceiling canopy (Zone 7) plus one neutral wire and a ground wire are also connected to the master dimming control. Wire connections could be completed with wire nuts or a quick-connect device. Each of the low voltage zones (Zones 2, 3, 5, 6 and 8) are connected to the low voltage terminals of the master dimming control via DC wire pairs.

Figure 31:
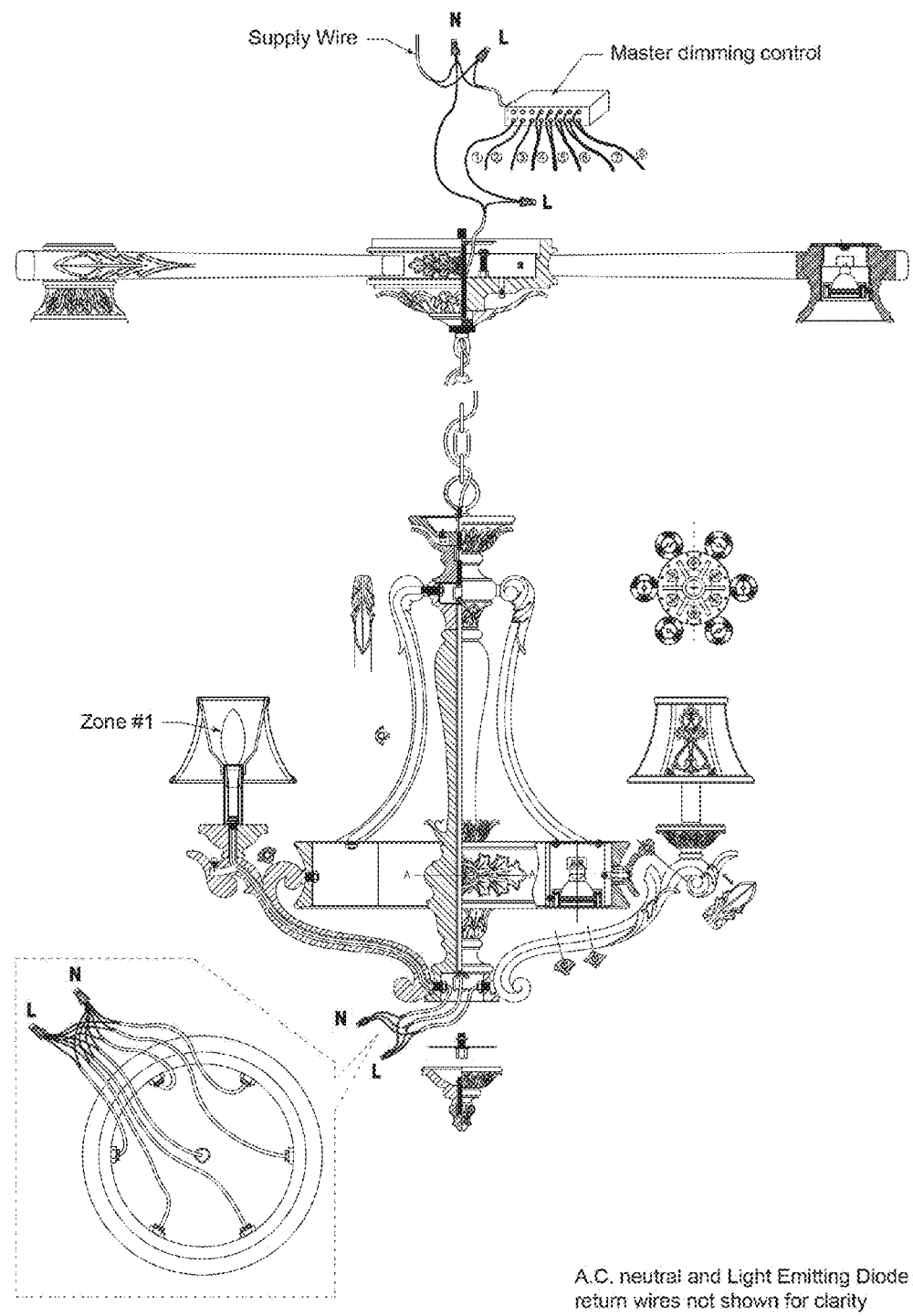
FIGS. 31-38 are elevation views of the lighting device of FIG. 29 showing details of wiring from the master dimming controller to each of the zones.
Figure 32:
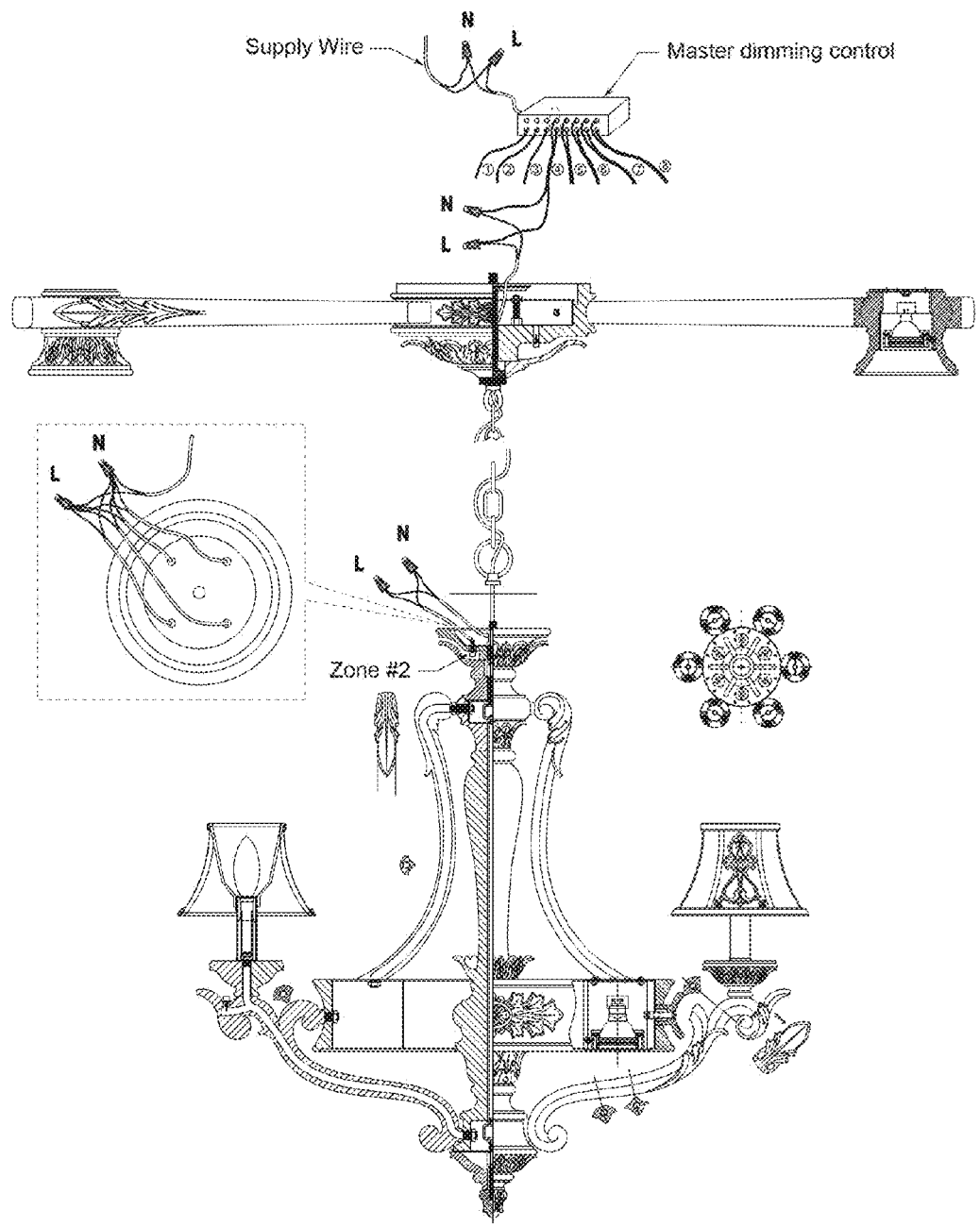
Figure 33:
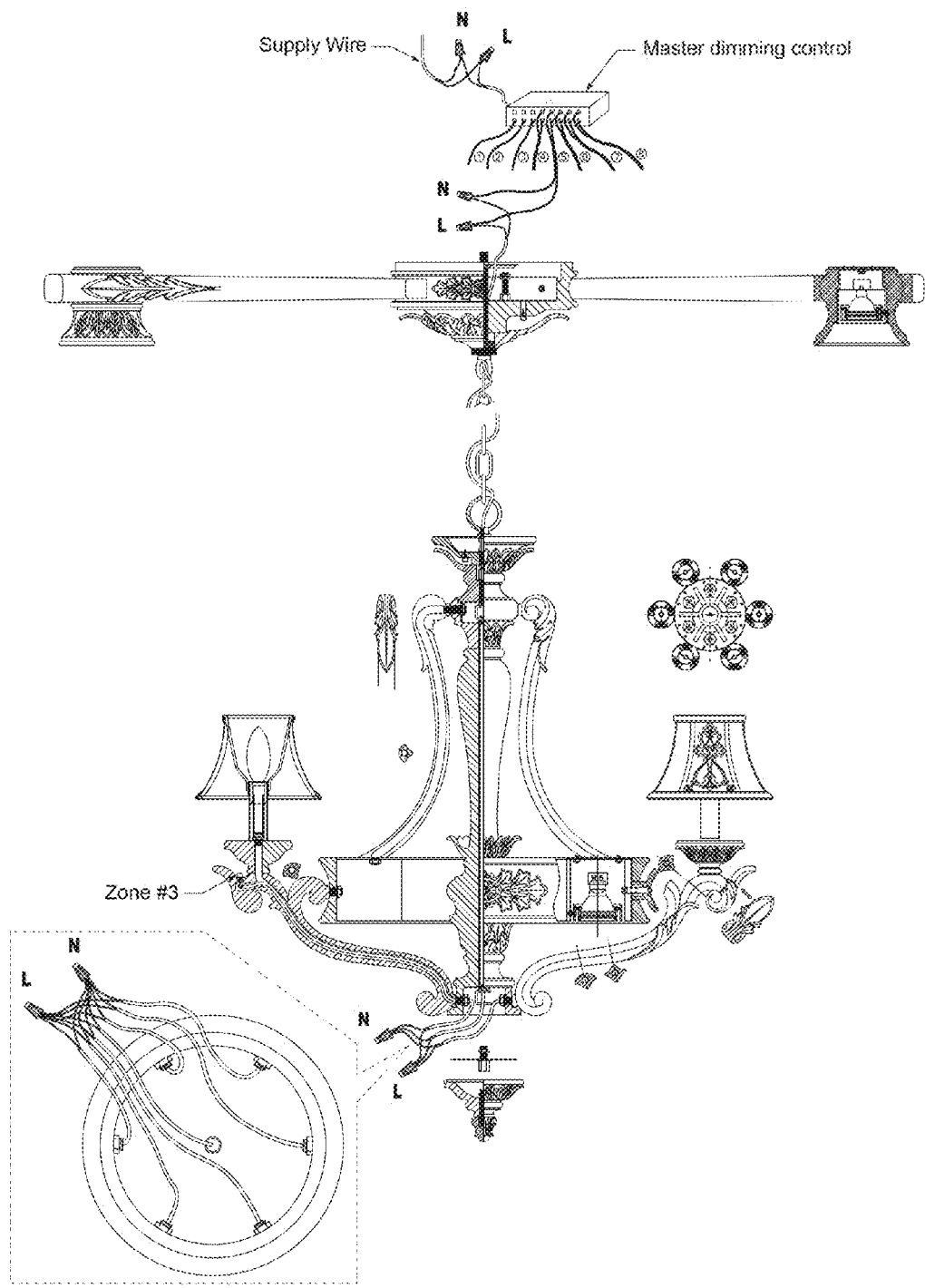
Figure 34:
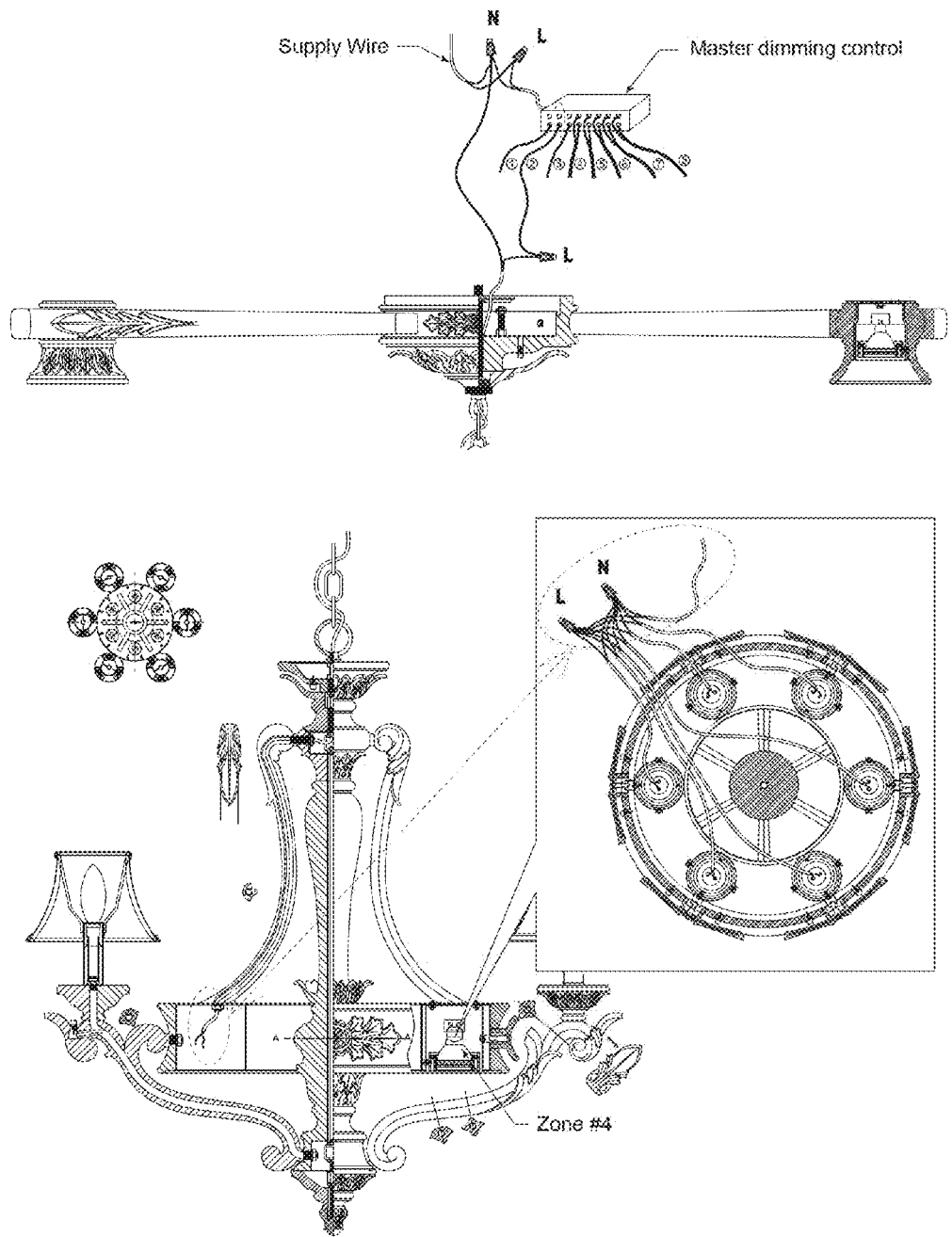
Figure 35:
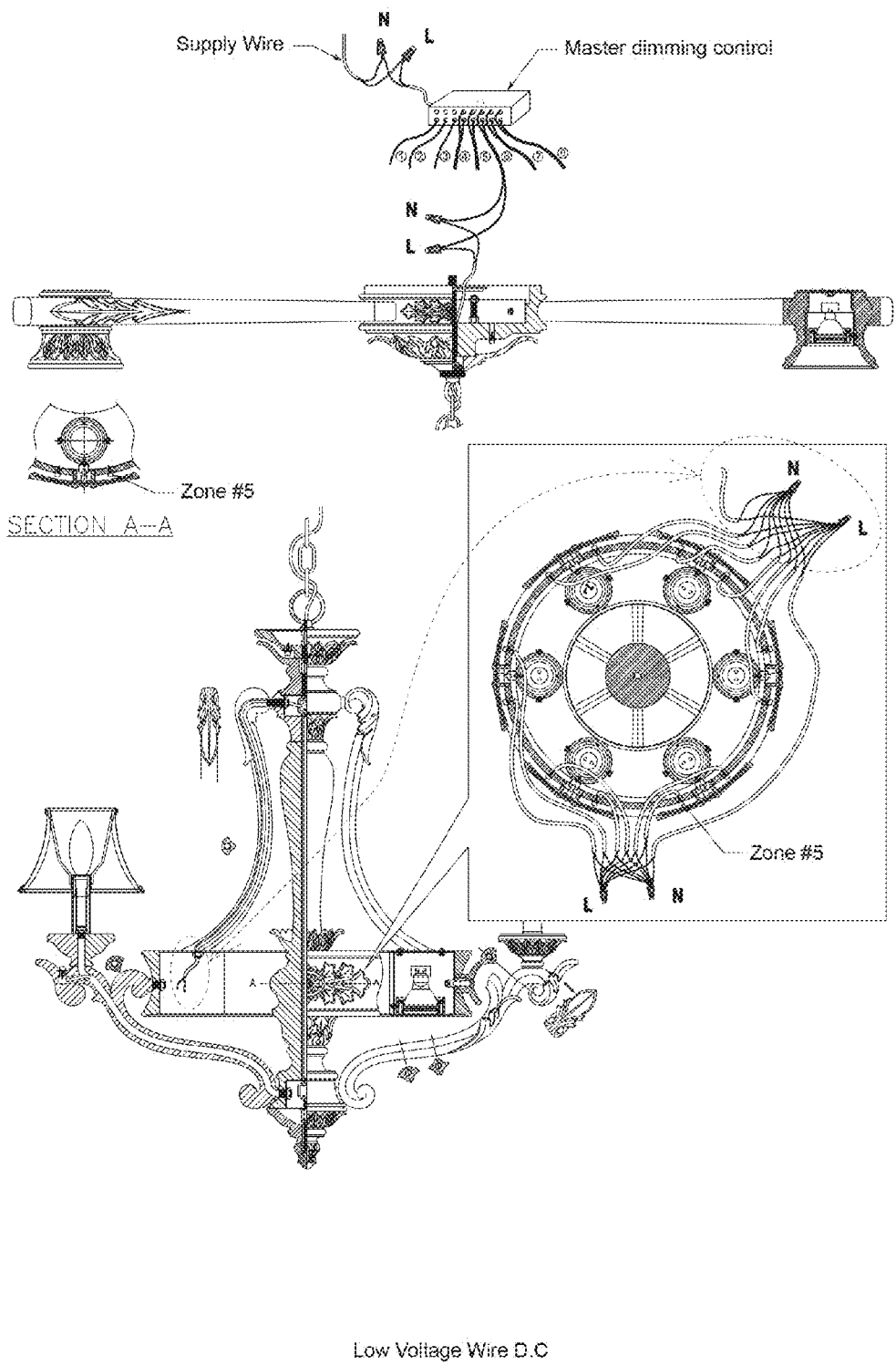
Figure 36:
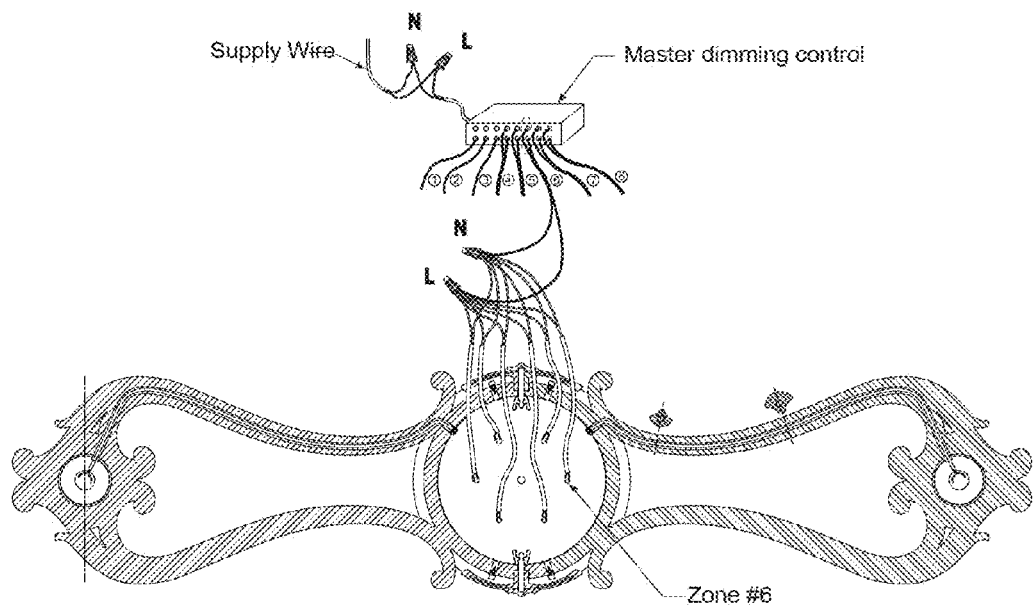
Figure 37:
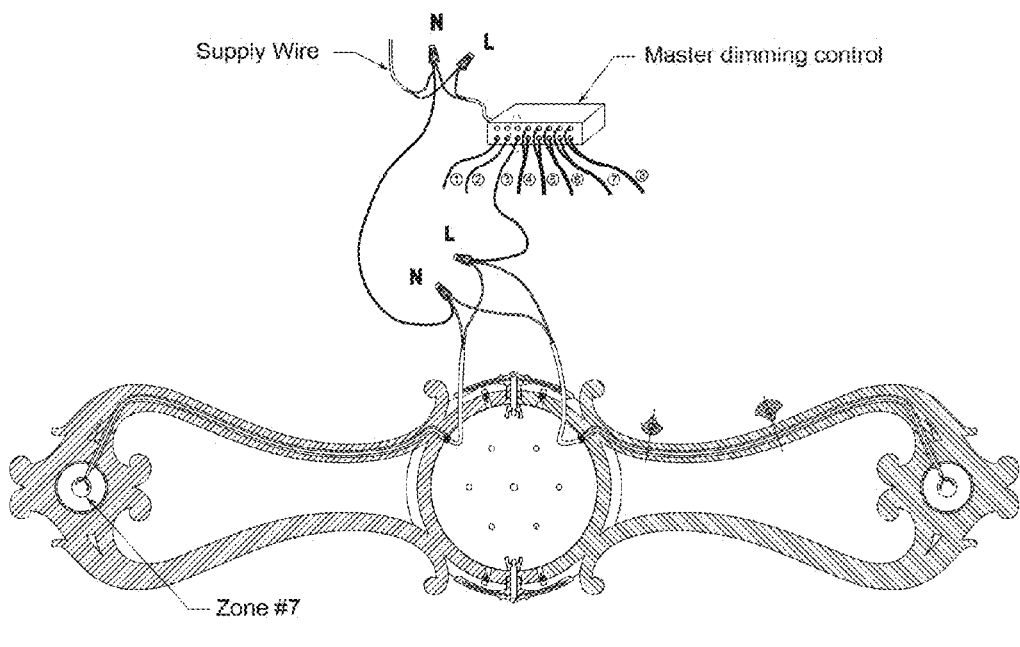
Figure 38:
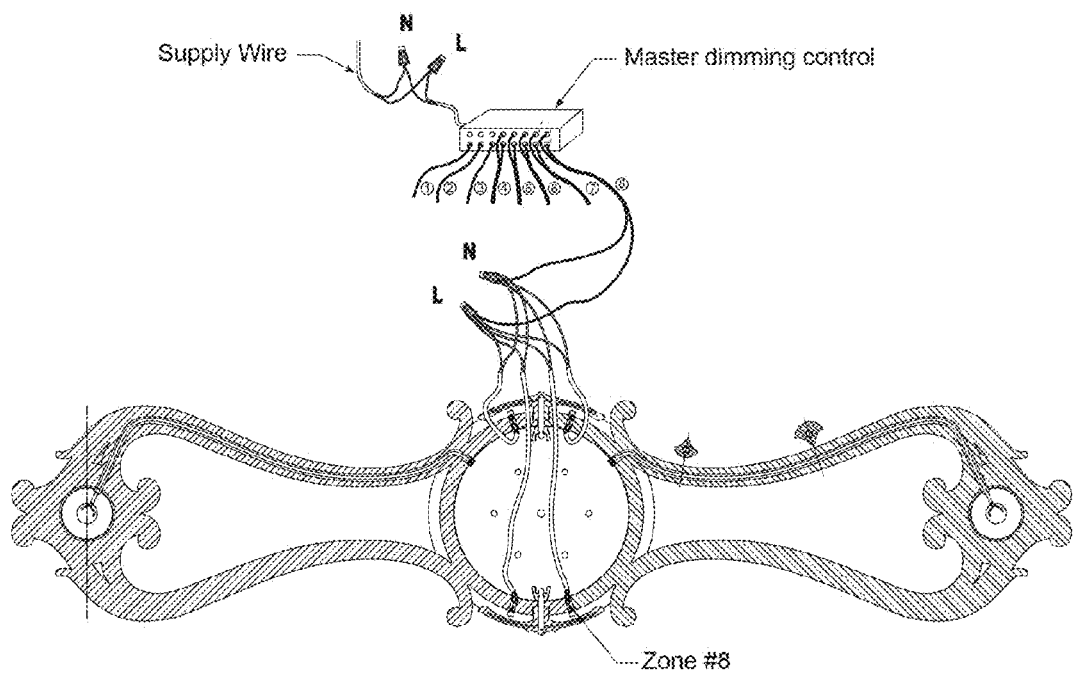

A single AC power supply wire comes into the master dimming control in the canopy and power is distributed to the various zones from there. FIG. 31 shows exemplary high voltage wiring from the Zone 1 output of the master dimming control to the six lighting fixtures of Zone 1. Similar high voltage connections are shown in FIGS. 34 and 37 for Zones 4 and 7. FIG. 32 shows exemplary low voltage wiring from the master dimming control to the four low voltage lighting fixtures of Zone 2. Similar low voltage connections are shown in FIGS. 33, 35, 36 and 38 for Zones 3, 5, 6 and 8.

Having described and illustrated the principles of the invention in various embodiments thereof, it should be apparent that the invention can be modified in arrangement and detail without departing from such principles. I claim all modifications and variations coming within the spirit and scope of the following claims.

What is claimed is:

1. A lighting system comprising:
a lighting device with a support structure supporting multiple lighting zones, each lighting zone including one or more lighting sources;
a control device remote from the lighting device, the remote control device including a user interface configured for a user to select a scene, the scene comprising a set of settings for one or more of the lighting zones; and
a dimming controller in communication with multiple dimmers supported by the lighting device, in which each of the lighting sources is coupled to a corresponding dimmer from the multiple dimmers, and the dimming controller is configured to communicate a controlled setting, based on the scene selected at the remote control device, to the multiple dimmers.

2. The lighting system of claim 1, in which the lighting sources are configured to be individually addressable.

3. The lighting system of claim 1, in which the lighting zones include lighting sources on the support structure for at least three of the following lighting zones: a general area lighting zone, a task lighting zone, an accent lighting zone, an indirect lighting zone, and a grazing lighting zone.

4. The lighting system of claim 1, in which the scene comprises a set of settings stored in a dimming control memory for one or more of the lighting zones.

5. The lighting system of claim 1, in which the user interface is operative to enable the user to input the set of settings for the scene and to store the set of settings in a memory.

6. A lighting system comprising:
a lighting device with a support structure supporting multiple lighting zones, each lighting zone including one or more lighting sources, in which the support structure includes a base portion and a body portion connected to the base portion, the body portion supporting the lighting sources for a first lighting zone and a second lighting zone, and the base portion having the lighting sources for a third lighting zone;
a control device remote from the lighting device, the remote control device including a user interface configured for a user to select a scene, the scene comprising a set of settings for one or more of the lighting zones; and
a dimming controller in communication with multiple dimmers supported by the lighting device, in which each of the lighting sources is coupled to a corresponding dimmer from the multiple dimmers, and the dimming controller is configured to communicate a controlled setting, based on the scene selected at the remote control device, to the multiple dimmers.

7. A lighting system comprising:
a lighting device with a support structure supporting multiple lighting zones, each lighting zone including one or more lighting sources, in which the support structure includes an upper portion and a lower portion suspended from the upper portion, the lower portion supporting the light sources for a first lighting zone and a second lighting zone and having a first diameter, and the upper portion having a second diameter at which the lighting sources for a third lighting zone are supported, the second diameter being greater than the first diameter;
a control device remote from the lighting device, the remote control device including a user interface configured for a user to select a scene, the scene comprising a set of settings for one or more of the lighting zones; and
a dimming controller in communication with multiple dimmers supported by the lighting device, in which each of the lighting sources is coupled to a corresponding dimmer from the multiple dimmers, and the dimming controller is configured to communicate a controlled setting, based on the scene selected at the remote control device, to the multiple dimmers.

8. A method of lighting multiple zones, the method comprising:
selecting a scene, the scene comprising preprogrammed settings for multiple lighting zones supported by a support structure of a lighting device;
communicating a controlled setting to multiple dimmers, the controlled setting being based, at least in part, on the selected scene, each dimmer communicating with a lighting source within the multiple lighting zones, the dimmer increasing or decreasing light emitted from the lighting source; and,
with the multiple dimmers, conforming an illumination level of the multiple lighting zones to the controlled setting.

9. The method of claim 8, in which selecting a scene comprises choosing from one or more available scenes at a control device that is remote from the lighting device.

10. The method of claim 8, in which communicating a controlled setting comprises communicating, from a master dimming control, the controlled setting to the multiple dimmers.

11. The method of claim 8, further comprising preprogramming the settings for the multiple lighting zones before selecting the scene.

12. The method of claim 11, in which the preprogramming comprises preprogramming the settings for the multiple lighting zones at a control device that is remote from the lighting device.

13. A suspended lighting device comprising a plurality of first light sources configured to provide upward-directed indirect lighting from a first plane; a plurality of second light sources configured to provide downward-directed task lighting from a second plane not coplanar to the first plane; a plurality of third light sources configured to provide general area lighting; and a substantially horizontal, linear support structure defining a linear chandelier and supporting the second light sources and the third light sources.

14. The lighting device of claim 13, the lighting device further comprising an accent light aimed from a third plane not coplanar to the first plane or the second plane to provide light beneath the lighting device.

15. The lighting device of claim 14, in which the accent light is configured to have adjustable aim.

16. The lighting device of claim 14, in which each of the first light sources, the second light sources, and the third light sources is coupled to power circuitry which includes a corresponding dimmer configured to control light emitted from the first light sources, the second light sources, and the third light sources, respectively.

17. The lighting device of claim 13, in which each of the plurality of third light sources is an omnidirectional light source.

18. The lighting device of claim 13, in which each of the plurality of third light sources has a fixed orientation with respect to the substantially horizontal, linear support structure.

19. The lighting device of claim 13, in which each of the plurality of third light sources includes a diffuser.

20. A suspended lighting device comprising a chandelier having a body diameter, one or more first light sources configured to provide upward-directed indirect lighting from a first plane; one or more second light sources configured to provide downward-directed task lighting from a second plane not coplanar to the first plane; and one or more third light sources configured to provide general area lighting, in which at least one of the second light sources is configured to provide downward-directed light, is affixed to the chandelier, and projects beyond the body diameter of the chandelier on a first side of the chandelier, and in which another of the second light sources is configured to provide downward-directed light, is affixed to the chandelier, and projects beyond the body diameter of the chandelier on a second side of the chandelier, the second side being opposite the first side of the chandelier.

* * * * *